(12) United States Patent
Breiter et al.

(10) Patent No.: US 8,812,424 B2
(45) Date of Patent: Aug. 19, 2014

(54) SEMANTIC WEB TECHNOLOGIES IN SYSTEM AUTOMATION

(75) Inventors: Gerd Breiter, Wildberg (DE); Dominik Jall, Boeblingen (DE); Markus Mueller, Eutingen (DE); Alexander Neef, Stuttgart (DE); Martin Reitz, Dettingen (DE)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 12/827,908

(22) Filed: Jun. 30, 2010

(65) Prior Publication Data

US 2011/0022560 A1    Jan. 27, 2011

(30) Foreign Application Priority Data

Jul. 21, 2009    (EP) ..................................... 09165949

(51) Int. Cl.
| | |
|---|---|
| *G06F 17/00* | (2006.01) |
| *G06N 5/02* | (2006.01) |
| *G06N 5/00* | (2006.01) |
| *G06F 17/27* | (2006.01) |
| *G06F 9/50* | (2006.01) |
| *G06F 11/30* | (2006.01) |
| *G06N 7/00* | (2006.01) |
| *G06N 7/08* | (2006.01) |

(52) U.S. Cl.
CPC .............. *G06N 5/00* (2013.01); *G06F 17/2785* (2013.01); *G06F 9/5038* (2013.01); *G06N 5/02* (2013.01); *G06F 11/3051* (2013.01)
USPC .................. 706/47; 706/55; 700/47; 709/223

(58) Field of Classification Search
CPC ........ G06N 5/02; G06N 5/00; G06F 11/3051; G06F 17/2785; G06F 9/5038
USPC .......................... 706/47, 55; 700/47; 709/223
See application file for complete search history.

(56) References Cited

U.S. PATENT DOCUMENTS

| | | | | |
|---|---|---|---|---|
| 5,204,939 | A | * | 4/1993 | Yamazaki et al. ............... 706/50 |
| 2007/0198456 | A1 | * | 8/2007 | Betz et al. .......................... 707/1 |

(Continued)

OTHER PUBLICATIONS

Zhou, I. et al, "Minerva: A Scalable OWL Ontology Storage and Inference System," The Semantic Web—ASWC 2006, Lecture Notes in Computer Science, 2006, vol. 4185/2006, 429-443, DOI: 10.1007/11836025_42.*

(Continued)

*Primary Examiner* — Jeffrey A Gaffin
*Assistant Examiner* — James F Sugent
(74) *Attorney, Agent, or Firm* — DeLizio Gilliam, PLLC

(57) ABSTRACT

A computer program product includes a storage medium with program code configured to maintain descriptions of a plurality of information technology resources in a computer-readable storage medium. The program code is configured to maintain a plurality of evaluation strategies. Responsive to detecting a command to change a first property of the set of properties of a first information technology resource of the plurality of information technology resources, the program code is configured to determine that a first of the evaluation strategies associates at least one of the plurality of rules with a form of the change to the first property of the first information technology resource. Also, responsive to detecting the command, the program code is configured to evaluate the at least one of the plurality of rules and performs the operation of the at least one rule.

12 Claims, 23 Drawing Sheets

(56) References Cited

U.S. PATENT DOCUMENTS

2007/0233627 A1* 10/2007 Dolby et al. .................. 706/45
2009/0177634 A1    7/2009 Behrendt et al.
2009/0177777 A1    7/2009 Behrendt et al.

OTHER PUBLICATIONS

Stojanovic, L. et al, "The role of ontologies in autonomic computing systems," IBM Systems Journal, vol. 43, No. 3, pp. 598-616, 2004.*

Stojanovic, Ljiljana, et al. "The role of ontologies in autonomic computing systems." IBM Systems Journal 43.3 (2004): 598-616.*

Mei, Jing, Elena Paslaru Bontas, and Zuoquan Lin. "OWL2Jess: A transformational implementation of the OWL semantics." Parallel and Distributed Processing and Applications—ISPA 2005 Workshops. Springer Berlin Heidelberg, 2005.*

Avery, John, and John Yearwood. "A formal description of ontology change in OWL." Information Technology and Applications, 2005. ICITA 2005. Third International Conference on. vol. 1. IEEE, 2005.*

"Pellet: OWL 2 Reasoner for Java", *Clark & Parsia* http://clarkparsia.com/pellet/ (Date Obtained from the Internet: Jun. 29, 2010) 2004, 2 pages.

Herman, Ivan et al., "W3C Semantic Web Activity", *W3* http://www.w3.org/2001/sw/ (Obtained from the Internet on Jun. 28, 2010) Last Updated: Mar. 9, 2010 1994 , 5 pages.

Herman, Ivan et al., "W3C Semantic Web Activity Publications", *W3* http://www.w3.org/2001/sw/Specs.html (Date Obtained from the Internet: Jun. 29, 2010) Last Updated: Jun. 22, 2010 1994, 4 pages.

Jall, Dominik , "Design, Implementation and Evaluation of a Semantics-Based System Automation Management Application", Sep. 30, 2007 , 144 ppgs.

Neef, Alexander , "Semantic Web in the Context of Interoperability Concerns in heterogeneous System Automation Environments", Nov. 20, 2007 , 32 ppgs.

Reitz, Martin , "Semantic Web in the Context of Utility Computing", Dec. 16, 2006 , 102 ppgs.

Reynolds, Dave , "Jena 2 Inference support", http://jena.sourceforge.net/inference/ (Date Obtained from the Internet: Jun. 29, 2010) Last Updated: Mar. 28, 2010 , 31 ppgs.

* cited by examiner

Ontology: Classes and Rules

| 301 | Class | oc:RealtimeApplication | |
|---|---|---|---|
| 302 | Rule 1 | Rank 2 | (?x oc:workload >60)<br>→ ADD (?x oc:warning true) |

| 303 | Class | oc:NormalApplication | |
|---|---|---|---|
| 304 | Rule 2 | Rank 2 | (?x oc:workload >95)<br>→ ADD (?x oc:warning true) |

| 305 | Class | oc:DispensibleApplication | |
|---|---|---|---|
| 306 | No Rule | | |

| 307 | Class | oc:CriticalResource | |
|---|---|---|---|
| 308 | Rule 3 | Rank 9 | (?x oc:warning true) &&<br>(?x oc:transaction true)<br>→ ADD (?x oc:alert true) |

| 309 | Class | oc:Resource | |
|---|---|---|---|
| 310 | Rule 4 | Rank 1 | (?x rdf:type oc:RealtimeApplication)<br>→ ADD (?x rdf:type oc:CriticalResource) |

Fig. 3a

Command queue

|  | Command | Statement | | |
|---|---|---|---|---|
|  |  | Subject | Predicate | Object |
|  |  | Resource | Datatype property or value property | Other resource or data value |
| 321 | ADD | oc:app1 | rdf:type | oc:RealtimeApplication |
| 322 | ADD | oc:app1 | rdf:type | oc:CriticalResource |
| 323 | ADD | oc:app2 | rdf:type | oc:NormalApplication |
| 324 | ADD | oc:app3 | rdf:type | oc:Dispensible Application |
| 325 | ADD | oc:app1 | oc:workload | 79 |
| 326 | ADD | oc:app1 | oc:transaction | true |
| 327 | ADD | oc:app2 | oc:workload | 83 |
| 328 | ADD | oc:app3 | oc:workload | 99 |
| 329 | ADD | oc:app1 | oc:warning | true |
| 330 | ADD | oc:app1 | oc:alert | true |
| 331 | REMOVE | oc:app1 | oc:transaction | true |
| 332 | REMOVE | oc:app1 | oc:alert | true |
| 333 | REMOVE | oc:app2 | rdf:type | oc:NormalApplication |

Fig. 3b

Evaluation Strategy Table

|     | Statement pattern | | | Subset of rules | |
| --- | --- | --- | --- | --- | --- |
|     | Changed Resource | Changed Property | Changed Value (for class-membership) | Rule | Pre-binding |
| 341 | ?x | rdf:type | oc:Realtime Application | Rule 4 | ----------------- |
| 342 | oc:app1 | oc:workload | * | Rule 1 | ?x = oc:app1 |
| 343 | oc:app1 | oc:warning | * | Rule 3 | ?x = oc:app1 |
| 344 | oc:app1 | oc:transaction | * | Rule 3 | ?x = oc:app1 |
| 345 | oc:app2 | oc:workload | * | Rule 2 | ?x = oc:app2 |

Fig. 3c

Rule List

|     | Rank | Rule | Pre-binding |
| --- | --- | --- | --- |
| 361 | 1 | Rule 4 | ?x = oc:app1 |
| 362 | 2 | Rule 1 | ?x = oc:app1 |
| 363 | 9 | Rule 3 | ?x = oc:app1 |
| 364 | 2 | Rule 2 | ?x = oc:app2 |

Fig. 3d

Knowledge Base Table

|  | Statement | | |
|---|---|---|---|
|  | Subject | Predicate | Object |
|  | Resource | Datatype property or value property | Other resource or data value |
| 381 | oc:app1 | rdf:type | oc:RealtimeApplication |
| 382 | oc:app1 | rdf:type | oc:CriticalResource |
| 383 | oc:app1 | oc:workload | 79 |
| 384 | oc:app1 | oc:transaction | true |
| 385 | oc:app1 | oc:alert | true |
| 386 | oc:app1 | oc:warning | true |
| 387 | oc:app2 | rdf:type | oc:NormalApplication |
| 388 | oc:app2 | oc:workload | 83 |
| 389 | oc:app3 | oc:workload | 99 |
| 390 | oc:app3 | rdf:type | oc:DispensibleApplication |

Fig. 3e

Conclusion Table

|  | Statement | Inferred statement | Generated command |
|---|---|---|---|
| 391 | 381 | 382 | 322 |
| 392 | 383 | 386 | 329 |
| 393 | 384 | 385 | 330 |
| 394 | 386 | 385 | 330 |

Fig. 3f

Evaluation Strategy Table

| | Changed Resource | Changed Property | Rule | Pre-binding |
|---|---|---|---|---|
| 501 | sa:serv1 | sa:hasDesiredState | sa:mapCompoundState | ?x = sa:serv1 |
| 502 | | | sa:startDependingResource | ?x = sa:serv1 |
| 503 | | | sa:startDirectResource | ?x = sa:serv1 |
| 504 | | | sa:forcedDownByResource | ?x = sa:serv1<br>?y = sa:db |
| 505 | sa:serv1 | sa:hasObservedState | sa:mapCompoundState | ?x = sa:serv1 |
| 506 | | | sa:startDirectResource | ?x = sa:serv1 |
| 507 | | | sa:forcedDownByResource | ?x = sa:serv1<br>?y = sa:db |
| 508 | sa:serv1 | sa:startAfter | sa:startDependingResource | ?x = sa:serv1 |
| 509 | | | sa:startDirectResource | ?x = sa:serv1 |
| 510 | | | sa:forcedDownByResource | ?x = sa:serv1<br>?y = sa:db |
| 511 | sa:db | sa:hasObservedState | sa:forcedDownByResource | ?x = sa:serv1<br>?y = sa:db |
| 512 | sa:servgrp | sa:hasCompoundState | sa:mapGroupCompoundState | ?x = sa:servgrp |

Fig. 5a

Command Queue: Automation Policy

|     | Command | Resource   | Property         | Value       |
| --- | ------- | ---------- | ---------------- | ----------- |
| 521 | ADD     | sa:serv1   | rdf:type         | sa:Resource |
| 522 | ADD     | sa:serv2   | rdf:type         | sa:Resource |
| 523 | ADD     | sa:db      | rdf:type         | sa:Resource |
| 524 | ADD     | sa:servgrp | rdf:type         | sa:Group    |
| 525 | ADD     | sa:db      | sa:hasDesiredState | online    |
| 526 | ADD     | sa:servgrp | sa:hasDesiredState | online    |
| 527 | ADD     | sa:servgrp | sa:hasMember     | sa:serv1    |
| 528 | ADD     | sa:servgrp | sa:hasMember     | sa:serv2    |
| 529 | ADD     | sa:servgrp | sa:startAfter    | sa:db       |

Fig. 5b

Command Queue: Automation Goal

|     | Command | Resource  | Property         | Value   |
| --- | ------- | --------- | ---------------- | ------- |
| 541 | ADD     | sa:servgrp | sa:hasDesiredState | offline |

Fig. 5c

Request Queue

|     | Command | Resource | State  |
| --- | ------- | -------- | ------ |
| 551 | REQUEST | sa:db    | online |

Fig. 5d

SEMANTIC WEB TECHNOLOGIES IN SYSTEM AUTOMATION

RELATED APPLICATIONS

This application claims priority benefit of European Patent Application No. 09165949.0, titled "Semantic Web Technologies in System Automation", having a filing date of Jul. 21, 2009.

BACKGROUND

System automation includes having a desired runtime behavior of Information Technology (IT) that can be described in a formal way and that an automation decision instance, an automation engine, performs tasks on behalf of a human operator. The focus of Tivoli® System Automation is on automating the availability of Information Technology (IT) resources. High availability is in particular relevant for mission-critical application systems, such as banking environments. IT resources are started and stopped in different scenarios, either intentionally for maintenance purposes or unintentionally when failures occur.

An automation domain or automation cluster is the scope of a set of IT resources that are automated by an automation manager. Typically, a cluster of server nodes is hosting these IT resources and there is one policy describing the desired automation behavior for the set of IT resources.

Conventional automation software is typically script-based or policy-based. Scripts are typically written by a system specialist and implement a desired automation behavior. Policies use an abstract configuration description of the IT resources that are used to run the application. A policy-based automation solution can allow performing a configuration change more easily than a script-based automation system.

The IT resources can comprise application software components, operating system software components, and hardware components to run the software components. Enterprise application environments are typically heterogeneous using diverse platforms, such as the IBM® Mainframe System z® operating system, Unix® operating system, and Windows® operating system, which are usually maintained by different system operators and require different skills, administration tools, and programming languages.

Resource groups are composed of members that share a common automation goal and are managed as one unit. Resource group members can be resource references, choice groups or other resource groups, thus allowing an arbitrary level of nested groups. The IT resources in the automation domain are in the automation scope and therefore managed by an automation engine. Therefore, these resources can also be called managed resources.

Automation can be goal-driven. This means that the automation manager knows the automation goal for each resource. The automation goal is typically represented by a goal request on the resource defining a "desired state" of the resource that the automation manager pursues. Possible desired states of the resource are, for example, "online" and "offline." When the desired state is "online", the automation manager is trying to keep the resource "online." In the case of the desired state being "offline", the automation manager is trying to maintain the "offline" state of the resource. An "observed state" describes a current state of an actual resource. If the observed state is "online", the resource is running. If the observed state is "offline", the resource is stopped. The differences between the "desired state" and the "observed state" are reflected in a so-called "compound state", which indicates whether the resource works as desired or whether not because problems may have occurred. For example, the "compound state" may indicate "ok" when the desired state and the observed state are the same, and the compound state may show "warning" or "error" when both states are different. A so-called "operational state" provides additional information about the "compound state."

The automation manager is further aware of relationships between the resources that are defined in an automation policy. Examples for relationships are "StartAfter", "StopAfter", "ForcedDownBy", and "DependsOn." If a first resource receives a goal request for the desired state to be "online" and has a "StartAfter" relationship with a second resource, the second resource will be started before the first resource. The automation manager ensures that the resource is only started or stopped when it has determined that any relationship conditions defined for the resource in an automation policy are fulfilled and no higher priority goal requests sent to the automation manager are waiting to be executed.

In an event-driven system automation, the automation engine of the automation manager subscribes to change events of the resources of the automation domain. The resources notify the subscribing automation engine in the case of a state change by sending a change event to the subscriber.

The Semantic Web provides a common framework that allows web data to be shared and reused across application boundaries. It is a collaborative effort led by the World Wide Web Consortium (W3C) to make information in the World Wide Web (WWW) accessible to machines and web agents by enrichment of web data with semantic information. The W3C standardizes the following technologies in a Semantic Web stack. The basis technologies are XML and URI. An Extensible Markup Language (XML) is a general-purpose specification for creating custom markup languages. A uniform resource identifier (URI) is a string of characters used to identify a resource on the Internet.

On top of XML and URI, a Resource Description Framework (RDF) provides a general method for conceptual description or modeling of information that is implemented in web resources. The RDF data model is based on an idea of making so-called RDF statements about resources, in particular, web resources, in the form of subject-predicate-object expressions. These expressions are also known as RDF triples in Semantic Web terminology. The RDF uses URIs to semantically describe the RDF statements. The subject is an URI that denotes the resource being described, and the predicate is an URI that denotes a trait or an aspect of the resource, which is either an object property or a datatype property. The object property links a resource represented by the subject to another resource represented by the object, which is also called a relationship between the respective resources. The datatype property links a resource represented by the subject to a data value represented by the object. The RDF is defined in an abstract model with several serialization formats, and so the particular way in which the triple is encoded varies from format to format. A single RDF statement can be represented by a graphical notation such as a conceptual graph. A collection of RDF statements may be displayed by an RDF graph.

A Web Ontology Language, in the literature named as OWL Web Ontology Language (OWL), further provides a model for specifying the semantics of the RDF elements in form of an ontology that is itself serialized in the RDF. Therefore, metadata describing the ontology is presented in the same format as the data representing the RDF statements and stored together in a knowledge base. The OWL is a family of knowledge representation languages for authoring ontologies and is endorsed by the W3C.

In computer and information science, an ontology is a formal representation of a set of concepts (classes) within a domain, individuals (instances) of the concepts, attributes (aspects, properties) of the concepts, and relationships between the concepts (classes). The ontology describes all the concepts, relationships, properties and rules that are relevant for a certain reasoning scope. For a Semantic Web based system automation, an ontology can describe all concepts that may occur in its automation domain. Reasoning on top of these layers, that is, using the ontology to infer further RDF statements, leads to a logic layer.

The Semantic Web typically makes an Open World Assumption (OWA). Knowledge about any resource can be spread all over the world. Everybody may add even wrong or inconsistent information to the Semantic Web. Therefore, a web agent is aware that it has to deal with incomplete, partially false or contradicting knowledge. Since the Semantic Web is based on the Open World Assumption, there are no mechanisms to ensure the constraints of ontologies. These constraints may be cardinality restrictions or datatype restrictions. With the OWA, a web agent can never assume that it has retrieved all RDF statements about a certain resource since further descriptions of the resource may exist in a part of the Semantic Web that is currently not accessible or was not found.

Furthermore, the Semantic Web agents assume that the knowledge of the domain is static and does not change over time. In the conventional Semantic Web, the web agent comprises a knowledge base which is never updated since the information provided in the Semantic Web is assumed to be static truth which does not change, especially not during a lifetime of a web agent. When resource changes occur, the conventional Semantic Web agent would not recognize the changes since the Semantic Web provides no mechanism for their recognition. A rebuild of the complete knowledge base is triggered manually to update changes. The lifetime of a web agent is assumed to be much shorter than the data provided in the Semantic Web.

A semantic reasoner, a reasoning engine, a rules engine, or simply, a reasoner, is an application that is able to infer logical consequences from a set of asserted facts (axioms). Reasoning means applying a set of inference rules to a set of knowledge to generate more knowledge. The inference rules are commonly specified by means of an ontology language and often a description language. Inference commonly proceeds by forward chaining and backward chaining. Forward chaining is data-driven. The forward chaining can start with the available data and work forward from an antecedent or rule head (if-clause) to a consequent or rule body (then-clause) of each inference rule to extract more data until all statements are inferred that are valid. Backward chaining is goal-driven. The backward chaining can start with a list of goals and work backwards from each consequent (then-clause) to a respective antecedent (if-clause) to see if there is data available that will support any of these consequents. Tabled backward chaining can store all previously computed matches to goals and use the recordings when trying to resolve future requests to the same goals. The memorized goals are commonly discarded when the inference metadata model is updated. The rule evaluation is monotonic when the amount of data is always increasing with the evaluation operations. Some commonly used solutions are "Jena—http://jena.sourceforge.net/, Pellet—http://pellet.owldl.com/, Bossam—http://bossam.wordpress.com/", etc.

Many reasoners use the Semantic Web Rule Language (SWRL) as a description language for the rules. Jena uses its own rule language, which is more restricted than SWRL. The reasoning strategy differs between the frameworks, but is mainly some sort of forward chaining, tabled backward chaining or hybrid solutions. Available rule systems have a flat view on rules. Rules are not organized in a hierarchical system. All rules are considered all the time. To test if a rule has to be evaluated, all the rules are considered in forward and backward chaining Since the rules are not organized in a hierarchical system, and there is no predetermined evaluation strategy in conventional Semantic Web reasoners, a change of the knowledge base, that is, adding one RDF statement, makes it necessary to apply all rules to all RDF statements in the knowledge base in order to perform forward chaining. The rules can contain variables. A variable binding is a replacement of every occurrence of a variable with one specific resource or one specific data value. A rule is satisfied if bindings of rule variables to respective parts of RDF statements are found in the knowledge base, where the parts of an RDF statement are subject, predicate, and object. Therefore, if one RDF statement is added to the knowledge base, all possible variable bindings have to be tested. That is, all statements of the knowledge base have to be applied to all rules in forward reasoning. And since a side-effect of satisfied rules is adding further inferred RDF statements to the knowledge base, the complexity of a reasoning algorithm is often exponential.

Conventional reasoners of the Semantic Web are monotonic. That is, these reasoners only add further inferred RDF statements to the knowledge base. Assumption is made that truth does not become invalid, so there is no need to remove RDF statements from the knowledge base while reasoning over resource descriptions that do not change over time. Reasoning is non-monotonic when additional information may lead to reasoning that changes the knowledge base in such a way that the amount of valid statements decreases. New or updated statements may result in the fact that rule conditions that have been satisfied previously are not satisfied any more. A satisfied rule may lead to an explicit removal of previously inferred RDF statements. Furthermore, if a rule is no longer valid, the statement that was derived from the rule becomes also invalid and has to be removed. In the case of non-monotonic reasoning, the outcome of the reasoning depends on the sequence in which the rules have been applied. In non-monotonic reasoning systems, the behavior of the reasoner becomes non-deterministic if there is no rule evaluation strategy that specifies the order in which rules are evaluated. This is, however, unsuitable for dynamic automation domains, such as System Automation, where the automation engine takes the role of a web agent and lives much longer than the descriptions of the IT resources that are managed and that do change their state over time.

Monotonic reasoners cannot handle dynamically changing resources. Since these reasoners do not know the interdependencies between the RDF statements in the knowledge base (that is, which RDF statement was inferred on the basis of which other RDF statements), the reasoner would have to revoke the entire set of inferred RDF statements in the knowledge base, resulting in a complete re-calculation.

The Open World Assumption, the static domain assumption, and the monotonicity of reasoning are design issues that restraint the applicability of Semantic Web technologies to a wide application area, namely dynamic, non-monotonic envi-

SUMMARY

Some example embodiments provide an apparatus and computer program product for an Information Technology (IT) automation, where an automation engine is receiving commands associated with monitored changes of IT resources from an automation adapter and is submitting action requests to the automation adapter for controlling the IT resources. Some example embodiments should firstly provide a human-readable and machine-processable representation of the IT resources and rules evaluated by the automation engine, where the representation is independent of the platform on which the automation system is running Secondly, in some example embodiments, the evaluation of the rules should be faster and more effective than with conventional semantic reasoners.

Some example embodiments include an apparatus and computer program product for an Information Technology (IT) automation, which comprise an automation domain, an automation adapter, and an automation engine. The automation domain is hosting IT resources. In some example embodiments, an apparatus and computer program product are configured to perform the following operations. A first operation can include monitoring, by an automation adapter, changes of the IT resources. The automation engine receives commands from the automation adapter. The commands are associated with the monitored changes of the IT resources from the automation domain. Pre-determined rules are evaluated in response to the commands. Action requests are submitted to the automation adapter for controlling the IT resources of the automation domain in response to the monitored changes of the IT resources and depending on the evaluation of the pre-determined rules. The automation adapter executes the submitted action requests on the IT resources.

In some example embodiments, an apparatus and computer program product further provide a representation of classes to be associated with the IT resources. The classes are associated with respective sets of pre-determined rules. A process state representation of the automation engine can be provided by a set of statements describing the respective IT resources. Evaluation strategy information is updated in response to the commands when the commands describe class-memberships of the respective IT resources. The evaluation strategy information associates command patterns and respective subsets of rules. The command patterns are determined to match respective sets of commands to be processed. The subsets of rules are selected from the sets of pre-determined rules that are associated with the respective classes. The process state representation is updated in response to the commands by executing the commands. Subsets of rules are selected based on the evaluation strategy information in response to the commands by selecting respective command patterns matching the commands being processed. Also, the selected rules can be evaluated.

Each command can comprise a respective operation and be associated with one or more statements. A command can have wildcards to represent multiple statements. A command pattern can specify an operation to match one or more command operations. A command pattern can have wildcards. A command matches a command pattern when parts of the command and respective parts of the command pattern have same explicit data values after replacing implicit wildcards with corresponding data values of the counterparts.

Some example embodiments relate to executing commands by performing one of the following operations: adding respective statements to the process state representation and removing respective statements from the process state representation. This means that the commands respectively add or remove the respective statements. The respective operations of the commands are "add" or "remove."

Some example embodiments relate to representing a command for updating an existing statement in the process state representation by a command for removing the existing statement and a subsequent command for adding a new statement.

Some example embodiments relate to updating the evaluation strategy information. Each of the pre-determined rules has a respective rule head and a respective rule body. The command pattern comprises a statement pattern to match a set of statements associated with respective commands to be processed. The evaluation strategy information is updated by performing the following depending on the command operation: In response to a command for adding a specific class-membership of a specific IT resource, a set of pre-determined rules associated with the specific class is determined. For each of the determined rules, a respective set of statement patterns is determined from the respective rule head. Each of the determined statement patterns is associated with a respective subset of the determined rules. The rules have respective pre-determined priorities to determine an order to evaluate the rules. The statement patterns and the rules can have variables to be bound to respective parts of statements. The statements are to be retrieved from the process state representation and to match respective parts of the rules. For each association of one respective statement pattern and one respective rule, one or more of their variables can be pre-bound to respective parts of statements, where the statements match respective parts of the rule. The parts of statements can comprise the specific IT resource. The resulting information is added to the evaluation strategy information. In response to a command for removing a specific class-membership of a specific IT resource, a part of information is removed from the evaluation strategy information, where the part of information has been added to the evaluation strategy information in response to a corresponding command for adding the specific class-membership of the specific IT resource.

Some example embodiments relate to selecting subsets of rules based on the evaluation strategy information by selecting respective statement patterns matching statements associated with the respective commands being processed. Each of the selected rules can comprise a respective pre-determined priority and, a respective pre-binding of one or more variables.

Some example embodiments relate to evaluating the selected rules when no more commands wait to be processed and no more rules are to be selected based on the evaluation strategy information. The evaluation of the selected rules comprises the following operations. A sort order of the selected rules is determined according to their pre-determined priorities resulting in sorted rules. For each rule head of the sorted rules, a respective subset of statements is retrieved from the process state representation. Each of the retrieved statements matches a respective part of the rule head and thereby the unbound variables of the rules are bound to respective parts of the retrieved statements. Each rule head is tested against one or more respective combinations of the retrieved statements. A combination of statements satisfies a rule head when each part of the rule head matches a respective statement of the combination of statements. For each of the sorted rules, one or more parts of the respective rule body are executed depending on a respective result from testing the respective rule head. The execution comprises one or more of the following operations. One or more commands are generated to be processed by the automation engine. The generated commands add respective inferred statements to the process state representation or remove respective statements from the process state representation. Alternatively or additionally, one or more action requests are generated to be submitted to the automation adapter.

Some example embodiments relate to repeating the updating operations and the selecting operation until no more commands are waiting to be processed. The commands are received commands and generated commands. The evaluating operation processes selected rules when no more subsets of rules are to be selected based on the evaluation strategy information. A transition from an initial process state to a final process state of the automation engine is completed when the commands have been processed, the subsets of rules have been selected based on the evaluation strategy information, and the selected rules have been evaluated.

The selecting operation has a higher priority than the evaluating operation. In some example embodiments, the evaluating operation is not started when the selecting operation still has to process commands. If the evaluation of a rule generates commands, the evaluating operation does not continue evaluating a next rule until new subsets of rules have been selected in response to the generated commands and a new sort order of the selected rules has been determined. The sorted rules comprise previously selected rules and the newly selected rules.

Some example embodiments relate to an ontology providing a semantic representation of the IT resources, their properties, the classes, and the rules. The semantic representation can be based on an OWL Web Ontology Language (OWL). The statements are resource description framework (RDF) statements and can have respective semantic three-part representations. The three parts of each statement are a subject, a predicate, and an object. The predicate links the subject to the object. The subject represents an IT resource, the predicate represents a property of the IT resource, and the object represents another IT resource or a data value.

In some example embodiments, the statements are also called triples. A statement pattern can have wildcards. A statement matches a statement pattern when the subject, the predicate, and the object of the statement have the same explicit data values as respective parts of the statement pattern after wildcards of the statement pattern have been replaced by corresponding explicit data values of the statement. A rule can have variables that can be pre-bound to explicit parts of statements, that is, resources or data values. A statement matches a part of the rule when parts of the statement and respective sub-parts of the rule have same explicit data values after replacing one or more unbound variables of the rule with corresponding explicit data values of the statement.

Some example embodiments relate to storing the process state representation in a knowledge base table having entries. Each table entry represents a respective statement and can specify the three parts.

Some example embodiments relate to storing the evaluation strategy information in an evaluation strategy table having entries. Each table entry specifies a respective statement pattern and a respective subset of rules. The statement patterns specify changed properties of IT resources. The statement pattern can relate to the three parts and can have wildcards to match one or more statements. Each of the rules has a respective pre-determined priority. The statement patterns and rules can have one or more pre-bindings of respective variables.

The pre-determined priority and the pre-bindings of one or more variables are stored for each of the rules. The pre-determined priority of the rule is also called a rank of the rule. In response to determining a subset of rules to be added to the evaluation strategy information, when a corresponding statement pattern exists in the evaluation strategy table, the determined subset of rules is appended to a corresponding table entry for the statement pattern. Otherwise, the determined subset of rules can be inserted into a new table entry. In response to determining a subset of rules to be removed from the evaluation strategy information, when a corresponding statement pattern exists in the evaluation strategy table, the determined subset of rules is removed from a corresponding table entry for the statement pattern. If the table entry has no more rules, the table entry is deleted.

Some example embodiments relate to performing pre-determined constraint and cardinality checks on properties of the IT resources. Commands are discarded when the constraint checks of respective statements fail. In response to a command for adding a first statement to the process state representation, a second statement is removed from the process state representation when the respective cardinality check allows at most one of the first and second statements in the process state representation. In response to executing a rule body of a rule and thereby generating a command for adding an inferred statement to the process state representation, an inference relationship between a subset of statements and the inferred statement is stored when the subset of statements has been retrieved from the process state representation and each of the retrieved statements matches a respective part of a rule head associated with the executed rule body. In response to a command for removing a statement from the process state representation, a stored inference relationship between a subset of statements and an inferred statements is resolved when the subset of statements comprises the statement to be removed. One or more inference relationships can be resolved. The resolved inference relationships are recursively deleted from storage and the inferred statements are recursively removed from the process state representation.

Some example embodiments include the automation adapter. An automation adapter can have multiple subscribing components. In some example embodiments, the automation adapter can have multiple subscribing automation engines. When the automation adapter receives a subscription to IT resources from a subscribing automation engine, the automation adapter starts polling initial resource descriptions of the subscribed IT resources. The automation adapter stores the polled initial resource descriptions. Initial commands are created for adding statements. The created commands are based on the polled initial resource descriptions. The created initial commands are sent to the subscribing automation engine. In response to a poll trigger, the automation adapter is polling subsequent resource descriptions of the subscribed IT resources. Differences between the polled subsequent resource descriptions and stored preceding resource descriptions are determined. The preceding resource descriptions have been stored in response to a preceding poll trigger. The automation adapter stores the polled subsequent resource descriptions. Subsequent commands for adding or removing respective statements are created. The commands describe the determined differences. The created subsequent commands are sent to the subscribing automation engine. When the automation adapter receives an un-subscription of IT resources from an unsubscribing automation engine, the automation adapter stops polling the subsequent resource descriptions of the un-subscribed IT resources if no more subscriptions exist.

In some example embodiments, a command for updating an existing statement is represented by a command for removing the existing statement and a subsequent command for adding a new statement. Another aspect of the embodiment is the IT resource. The IT resource can be an individual IT component or a group of IT components. In some example embodiments, the IT component is a hardware component or a software component of a computer system.

Some example embodiments further relate to an automation system, which comprises an automation domain, an automation adapter, and an automation engine. The automation domain is hosting IT resources. The automation adapter is monitoring changes of the IT resources from the automation domain and controls the IT resources by executing action requests on the IT resources. The automation engine receives commands from the automation adapter. The commands are associated with the monitored changes of the IT resources from the automation domain. In response to the commands, pre-determined rules are evaluated. In response to the monitored changes of the IT resources and depending on the evaluation of the pre-determined rules, action requests are submitted to the automation adapter for controlling the IT resources of the automation domain. The system is characterized in that it further can comprise: storage means, an evaluation strategy updater, a process state updater, a rule selecting component, and an evaluating component. The storage means stores a process state representation of the automation engine by a set of statements describing the respective IT resources, store a representation of classes to be associated with the IT resources, and store evaluation strategy information. The classes are associated with respective sets of pre-determined rules. In response to the commands when the commands describe class-memberships of the respective IT resources, the evaluation strategy updater updates the evaluation strategy information. The evaluation strategy information associates command patterns and respective subsets of rules. The command patterns are to match respective sets of commands to be processed. The subsets of rules are selected from the sets of pre-determined rules that are associated with the respective classes. In response to the commands, the process state updater updates the process state representation by executing the commands. In response to the commands, the rule selecting component selects subsets of rules based on the evaluation strategy information by selecting respective command patterns matching the commands being processed. The evaluating component is evaluating the selected rules.

Some example embodiments include an adapted means of the automation adapter, a knowledge base table, a command queue, an evaluation strategy table, a conclusion table, a sorted rule list, a consistency checker, adapted means of the evaluation strategy updater, adapted means of the process state updater, adapted means of the rule selecting component, a rule sorting component, adapted means of the evaluating component, and a controller. The adapted means of the automation adapter can store polled resource states of subscribed IT resources.

The knowledge base table stores the set of statements representing the process state. Each entry of the table can represent a respective statement that specifies three respective parts: an IT resource, a property of the IT resource, and another IT resource or a data value.

Some example embodiments relate to representing the ontology, metadata information, temporary information, and internal information by further respective sets of statements. The command queue temporarily stores commands to be processed by the automation engine. The commands are received commands and generated commands.

The evaluation strategy table stores the evaluation strategy information. Each entry of the table specifies a respective statement pattern to match a respective subset of statements associated with respective commands to be processed and specifies a respective subset of rules to be evaluated. The statement patterns specify changed properties of IT resources. Each of the rules has a respective pre-determined priority. The statement patterns and the rules can have one or more pre-bindings of respective variables.

In response to executing a rule body of a rule and thereby generating a command for adding an inferred statement to the process state representation, the conclusion table stores an inference relationship between a subset of statements and the inferred statement when the subset of statements has been retrieved from the process state representation and each of the retrieved statements matches a respective part of a rule head associated with the executed rule body. The sorted rule list can temporarily store the sorted rules to be evaluated in an order according to the respective pre-determined priorities.

The consistency checker discards commands when constraint checks on properties of IT resources of respective statements fail. In response to a command for adding a first statement to the process state representation, the consistency checker removes a second statement from the process state representation when a cardinality check on a property of an IT resource allows at most one of the first and second statements in the process state representation. In response to a command for removing a statement from the process state representation, the consistency checker resolves based on the conclusion table a stored inference relationship between a subset of statements and an inferred statement when the subset of statements comprises the statement to be removed. One or more inference relationships can be resolved. The resolved inference relationships are recursively deleted from the conclusion table. The inferred statements are recursively removed from the process state representation.

In response to a command for adding a specific class-membership of a specific IT resource, adapted means of the evaluation strategy updater determines a set of pre-determined rules associated with the specific class. For each of the determined rules, a respective set of statement patterns is determined from the respective rule head. Each of the determined statement patterns is associated with a respective subset of the determined rules. The rules have respective pre-determined priorities to determine an order to evaluate the rules. The statement patterns and the rules can have variables to be bound to respective parts of statements. The statements are to be retrieved from the process state representation and to match respective parts of the rules. For each association of one respective statement pattern and one respective rule, one or more of their variables can be pre-bound to respective parts of statements, where the statements match respective parts of the rules. The parts of statements can comprise the specific IT resource. The resulting information is added to the evaluation strategy information. In response to a command for removing a specific class-membership of a specific IT resource, a part of information is removed from the evaluation strategy information. The part of information has been added to the evaluation strategy information in response to a corresponding command for adding the specific class-membership of the specific IT resource.

The adapted means of the process state updater executes the commands by performing one of the following operations: adding respective statements to the process state representation and removing respective statements from the process state representation. The adapted means of the rule selecting component selects subsets of rules based on the evaluation strategy information by selecting respective statement patterns that match statements associated with respective commands being processed. The rule sorting component determines a sort order of the selected rules according to their pre-determined priorities resulting in sorted rules when no more commands wait in the command queue to be processed and no more subsets of rules are to be selected based on the evaluation strategy information.

The adapted means of the evaluating component evaluates the sorted rules. For each rule head of the sorted rules, a respective subset of statements is retrieved from the process state representation. Each of the retrieved statements matches a respective part of the rule head. Thereby, the unbound variables of the rules are bound to respective parts of the retrieved statements. Each rule head is tested against one or more respective combinations of the retrieved statements. For each of the sorted rules, one or more parts of the respective rule body are executed depending on a respective result from testing the respective rule head. The execution can comprise one or more of the following operations: generating one or more commands to be processed by the automation engine and generating one or more action requests to be submitted to the automation adapter. The generated commands add respective inferred statements to the process state representation or remove respective statements from the process state representation.

The controller controls repetitions of the operations performed by the evaluation strategy updater, the process state updater, and the rule selecting component until no more commands wait in the command queue to be processed. The commands are received commands and generated commands. The controller controls further repetitions of the operations performed by the rule sorting component and the evaluating component when no more subsets of rules are to be selected based on the evaluation strategy information. A transition from an initial process state to a final process state of the automation engine is completed when the command queue and the sorted rule list are empty and no more commands and rules are being processed.

Some example embodiments further relate to a computer program product for processing data in an automation system. The computer program product comprises a computer usable medium having computer usable program code embodied therewith. The computer usable program code is configured to perform the following operations. An automation adapter is monitoring changes of the IT resources hosted by an automation domain. An automation engine receives commands from the automation adapter. The commands are associated with the monitored changes of the IT resources from the automation domain. Pre-determined rules are evaluated in response to the commands. Action requests are submitted to the automation adapter for controlling the IT resources of the automation domain in response to the monitored changes of the IT resources and depending on the evaluation of the pre-determined rules. The automation adapter executes the submitted action requests on the IT resources. A representation of classes to be associated with the IT resources is provided. The classes are associated with respective sets of pre-determined rules. A process state representation of the automation engine is provided by a set of statements describing the respective IT resources. Evaluation strategy information is updated, in response to the commands when the commands describe class-memberships of the respective IT resources. The evaluation strategy information associates command patterns and respective subsets of rules. The command patterns are determined to match respective sets of commands to be processed. The subsets of rules are selected from the sets of pre-determined rules that are associated with the respective classes. The process state representation is updated in response to the commands by executing the commands. Subsets of rules are selected based on the evaluation strategy information in response to the commands by selecting respective command patterns matching the commands being processed. And the selected rules are evaluated.

BRIEF DESCRIPTION OF THE DRAWINGS

For better understanding of the embodiments and as how the embodiments can be carried into effect, reference will now be made by way of example only to the accompanying drawings in which:

FIGS. 3a-f illustrate a sample ontology and sample contents of data structures of the automation engine for an operations console system, according to some example embodiments.

FIGS. 5a-d illustrate sample contents of data structures of the automation engine for the server automation system, according to some example embodiments.

DESCRIPTION OF EMBODIMENTS

Figure 1:
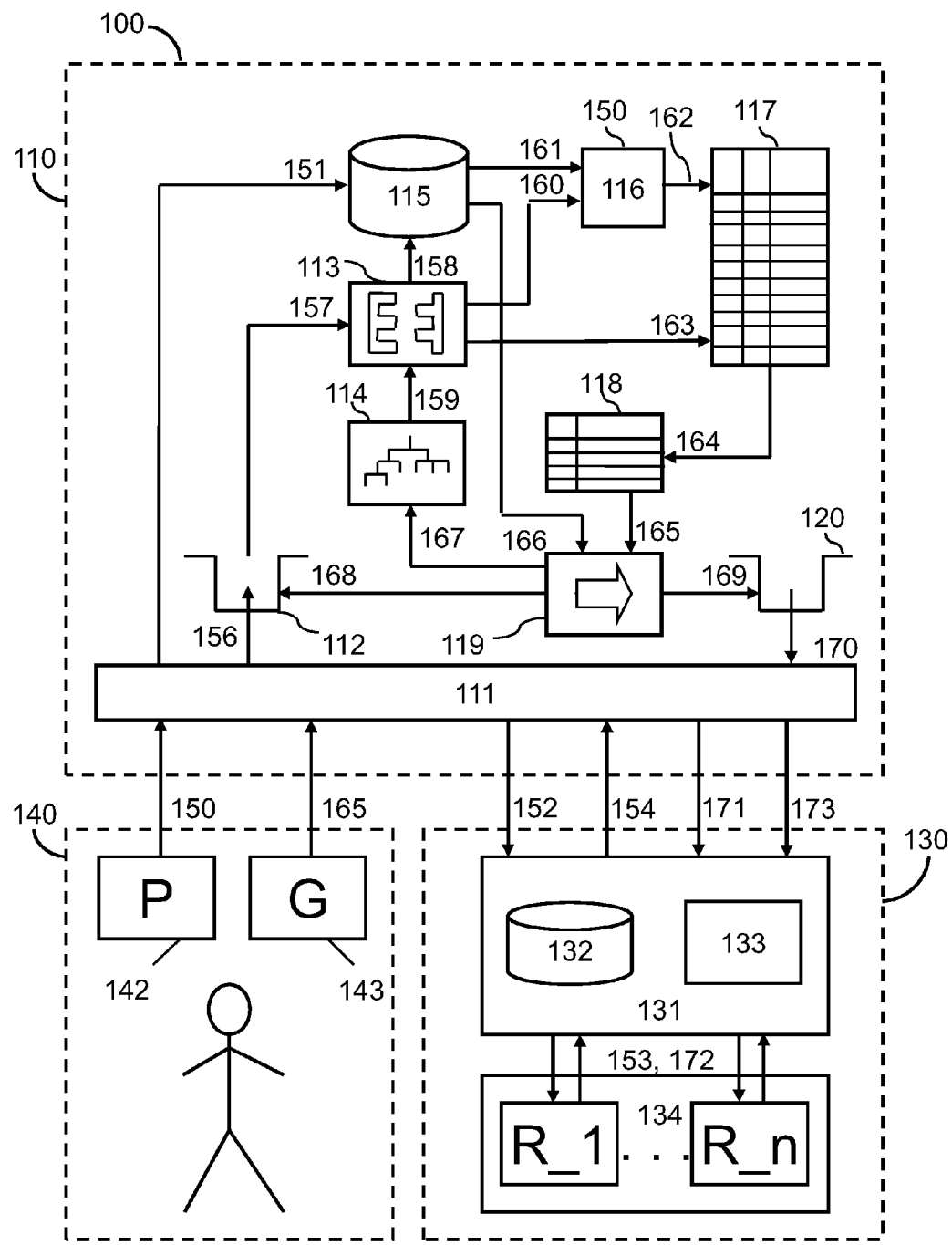
FIG. 1 illustrates a block diagram showing the components of the IT automation system, according to some example embodiments.

Some example embodiments abandon the Open World Assumption (OWA) of the Semantic Web and take the Closed World Assumption (CWA) instead. In this case, the automation engine, which takes the role of a web agent in a Semantic Web environment, has control over information since the knowledge base of the automation engine is only updated by one application and can be maintained in a consistent state. Thus, the CWA allows a creation of a Semantic Web variant that forms a solution for System Automation.

After a subscription to a resource, an RDF graph generator of the automation adapter sends a complete RDF representation to the automation engine. In some example embodiments, when a resource changes, only the changed resource state is published to the subscribing automation engine. This reduces information sent to the automation engine to a minimum and allows the automation engine to update the knowledge base in an incremental way instead of completely deleting old representations of the resources and inserting their new representations.

Some example embodiments further implements a publish-subscribe mechanism, which allows the resources to publish changes of the resource states to the knowledge base by means of a change event. An event-driven update of the resource descriptions in the knowledge base is triggered by the modified resources and ensures that the automation engine has an almost up-to-date image of the automation domain in the knowledge base.

In the conventional Semantic Web, there are no mechanisms to guarantee a validity of the constraints of the ontology. Some example embodiments provide a consistency checker that ensures that an update of the knowledge base will not cause an inconsistency of the knowledge base. This consistency check can prevent the knowledge base from containing statements violating ontology constraints or stall statements that have been deduced from other statements that have been changed or deleted at a later point of time.

The problem of non-monotonic updates of the knowledge base is solved by a conclusion graph tree structure which stores additional information about deduction-dependencies during the reasoning process. When the consistency checker determines a subgraph of stall statements that have to be removed from the knowledge base as a result of the update of the knowledge base, the conclusion graph tree structure allows retrieval of the dependent statements easily and removal them from the knowledge base instead of rebuilding the complete knowledge base.

The paradigm of object-oriented programming encapsulates functionality and data on a granularity of objects that are organized in classes. The encapsulation hides data that is specific to one particular class from other classes. Instead of flat views on resources and rules, rules are grouped in classes and relationships. Beside other aspects, a class is a container for rules providing a model of a procedural behavior of resources associated with this class. A relationship is another container for rules, which links two resources that can be assigned to different classes. A subset of rules is only valid for a certain resource or a group of resources. The complete behavioral rules model for a certain class (concept) of resources can be organized, separated, or derived from other classes (concepts) and their rules.

In contrast to existing rule engines that have no evaluation strategy at all, the dynamic reasoner of some example embodiments computes its evaluation strategy in a preparational operation before normal operation. In conventional reasoners, such as an expert system, reasoning is only performed after the web agent has submitted a query to the domain of the resources. In some example embodiments, a rule set is analyzed and evaluation strategy information is appropriately updated before receiving a change event. This information can be stored in an evaluation strategy table, which is also called relaxation table, and comprises the rule sets for all possible changes on each of the resources in the domain. This is only possible if the domain is closed, thus following the closed world assumption (CWA). Some example embodiments of the evaluation strategy information enable the reasoning complexity to be reduced from exponential to linear. Instead of determining which rules apply to a change event by scanning the complete rule set every time, only a small portion of the rules are to be retrieved from the evaluation strategy information and evaluated in a pre-defined order. The order of rule execution is controlled by a rank. The rank may be implemented as an integer number with a definable range, for example, 0 to 15. Each rule has a rank. A subset of rules is bundled into at least one of the classes and relationships which are linked to the resources. The subset of rules and the link to the resource are stored in the evaluation strategy table at runtime in response to a command for assigning a resource to a class of the ontology. When commands describe properties of resources, the evaluation strategy information is not updated, but only queried.

When the rule set is ready to be evaluated, the highest-ranked rules are evaluated first, and then the lower-ranked rules. The arrangement of rules in form of classes and relationships and the assignment of a rank to each of the rules enables a deterministic outcome can be guaranteed in a non-monotonic reasoning model.

When a conventional reasoner has to handle a change of information, the reasoner loads a resource description into the knowledge base upon initialization. A change of information in the domain is not reflected in the knowledge base until a new query is performed. The new query will load the changed information and perform a new cycle of reasoning which may lead to a poor performance. In some example embodiments, however, the reasoning process is started based on changes in the knowledge base. Only the changed parts of the knowledge base are taken into account. This immediate reasoning keeps the knowledge base in a consistent state.

FIG. 1 illustrates a block diagram showing the components of the IT automation system, according to some example embodiments. In particular, FIG. 1 is a block diagram showing components of an automation system (100) comprising an automation domain (130), an automation engine (110), and a system operating component (140). The automation domain (130) is hosting resources (134), that is, $R\_1 \ldots R\_n$. Each automation domain uses an automation adapter (131) to communicate with at least one automation engine (110). The automation adapter contains an adapter local database (132) for storing (153) current resource states of the resources (134) in response to a poll trigger. The automation adapter further contains a graph generator (133) for creating commands for adding respective statements to the knowledge base (115) of the automation engine (110) and for removing respective statements from the knowledge base (115), where the statements are describing respective resources.

The automation adapter (131) maintains the subscriptions (152) of the automation engine (110) to a set of the resources (134) and sends (154) the created commands to the subscribing automation engine (110). A basic ontology comprises class definitions and associated sets of pre-determined rules, which are stored in the automation engine (110), (e.g., in the knowledge base (115)) and rarely changed. The system operating component (140) provides (150) an automation policy (142), which is at least partly stored (151) in the knowledge base (115). The automation policy (142) is represented by the ontology and defines class-memberships of a full set of resources and their properties. The automation policy can additionally comprise further class definitions and sets of pre-determined rules to enhance the basic ontology. Automation goals (143) are requested by the system operating component (140) and typically describe property changes of only a few resources. In some example embodiments, the automation goals (143) change the process state of the automation engine more frequently than the automation policy (142).

A controller (111) is the communication interface of the automation engine (110) with the automation domain (130) and the system operating component (140). The incoming (154) commands from the automation adapter (131) are stored (156) in a command queue (112). The commands are either add commands for adding respective statements to the knowledge base (115) and remove commands for removing respective statements from the knowledge base (115). A consistency checker (113) subsequently processes (157) the commands from the command queue (112) and performs syntax and consistency checks on the commands. When the respective statements of the commands violate constraint rules, they can be discarded. In the case of an add command, duplicate statements are usually discarded, whereas unique statements are added (158) to the knowledge base (115). When statements of add commands violate cardinality constraints, the statements are added (158) to the knowledge base. Corresponding existing statements that caused the cardinality violations, however, are removed (158) from the knowledge base (115). In the case of a remove command, the respective statement will be usually removed from the knowledge base. When the consistency checker removes a statement from the knowledge base, inferred statements are resolved (159) based on a conclusion graph tree structure (114). The inferred statements have been generated in a previous process operation and depend on the statement that is now removed from the knowledge base. In some example embodiments, remove commands are generated for the inferred statements and put in the command queue (112). Alternatively, the consistency checker can directly delete the inferred statements from the knowledge base. The inference relationship for the inferred statement is removed from the conclusion graph tree structure. In place of the consistency checker, a dedicated process state updater can add or remove statements from the knowledge base.

When a statement of a command describes a class-membership of a resource, the command is forwarded (160) to an evaluation strategy updater (116), which updates (162) evaluation strategy information stored in an evaluation strategy table (117). The evaluation strategy information associates statement patterns and respective subsets of rules derived from the sets of pre-determined rules associated with the respective classes. Add commands describing class-memberships add respective sets of associations to the evaluation strategy table. Remove commands describing class-memberships remove the respective sets of associations from the evaluation strategy table. The update of the evaluation strategy table is usually triggered when an automation policy (142) is loaded (150) into the automation engine (110). The next operations are not restricted to commands describing class-memberships: A rule selecting component of the automation engine selects (164) subsets of rules from the evaluation strategy table (117) by determining statement patterns matching (163) the statements of the commands being processed. A rule sorting component of the automation engine sorts the selected subsets of rules according to their pre-determined priorities, and stores (164) the sorted rules in a sorted rule list (118). A semantic reasoner (119) retrieves (165) the rules in the order of their priorities and evaluates the retrieved rules. For each of the retrieved rules, the reasoner retrieves (166) a respective subset of statements from the process state representation stored in the knowledge base (115), where each of the retrieved statements matches a respective part of the rule head of the retrieved rule. The rule head is tested against one or more combinations of the retrieved statements. A logical result of the test is either true or false. Depending on the result, the reasoner executes one or more parts of the rule body. The execution can comprise generating further commands, which are stored (168) in the command queue (112), and generating action requests, which are forwarded (169) to a request queue (120). The further commands are processed (157) by the consistency checker (113) in a next cycle of an iteration loop. The action requests are submitted (170, 171) to the automation adapter (131) of the automation domain (130) to control (172) the resources (134). In response to an un-subscription (173), the automation adapter stops polling (153) the unsubscribed resources when no more subscriptions exist.

Figure 2A:
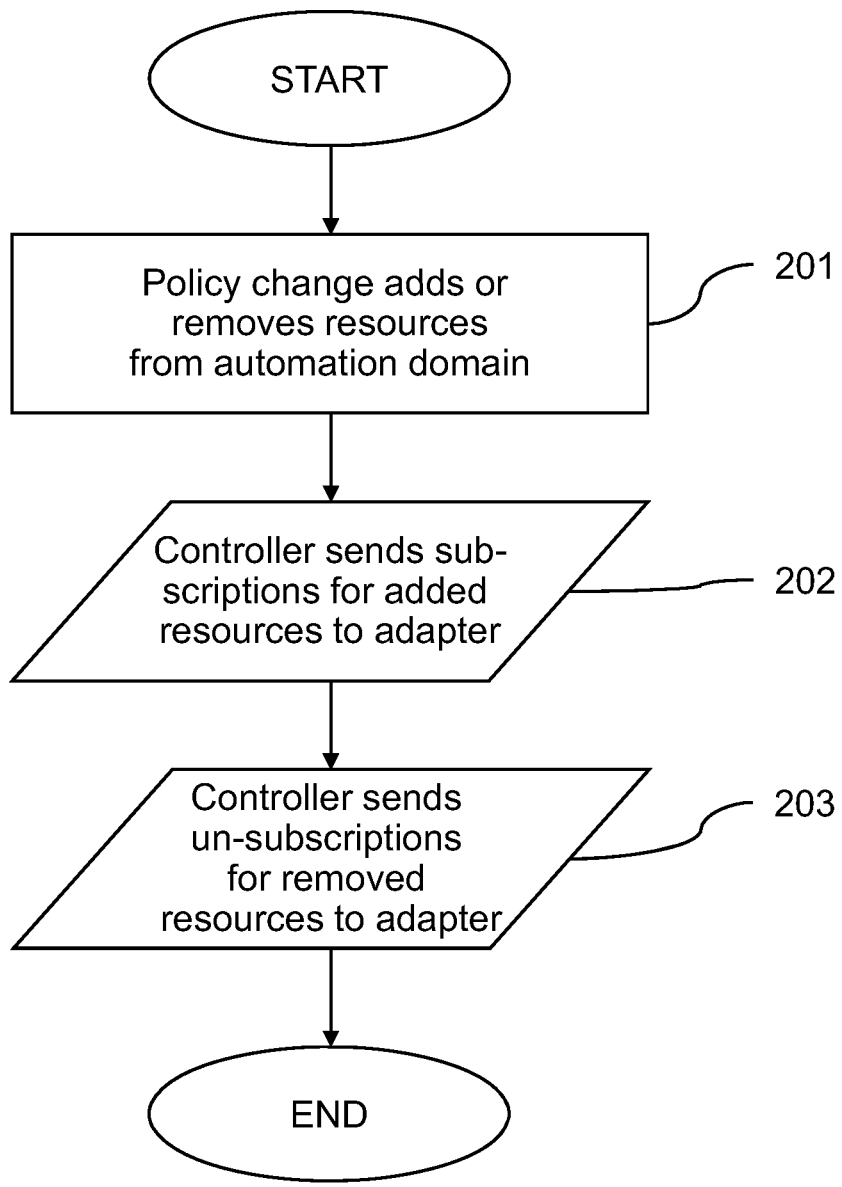
FIGS. 2a-j illustrate flow charts for the data processing method of the IT automation system, according to some example embodiments.

FIGS. 2a-j illustrate flow charts for the data processing method of the IT automation system, according to some example embodiments. FIG. 2a shows a method when the automation engine sends subscriptions and un-subscriptions of resources to the automation adapter of the automation domain. In response to resource changes (201) of the automation policy, resources are added to the automation domain or removed from the automation domain. In the case of adding resources, the controller sends (202) subscriptions for the added resources to the automation adapter. In the case of removed resources, the controller sends (203) un-subscriptions for the removed resources to the automation adapter.

Figure 2B:
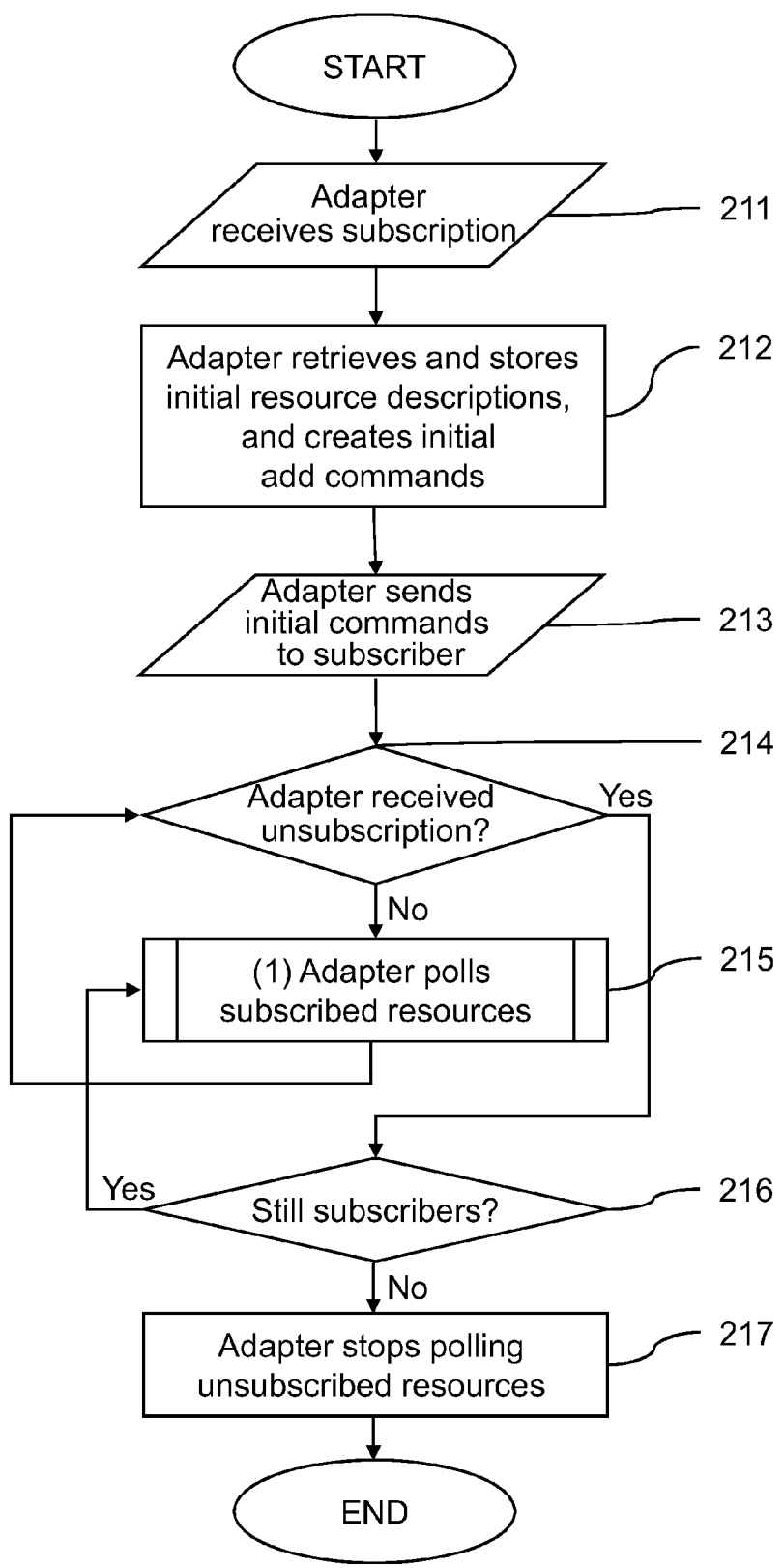
Figure 2C:
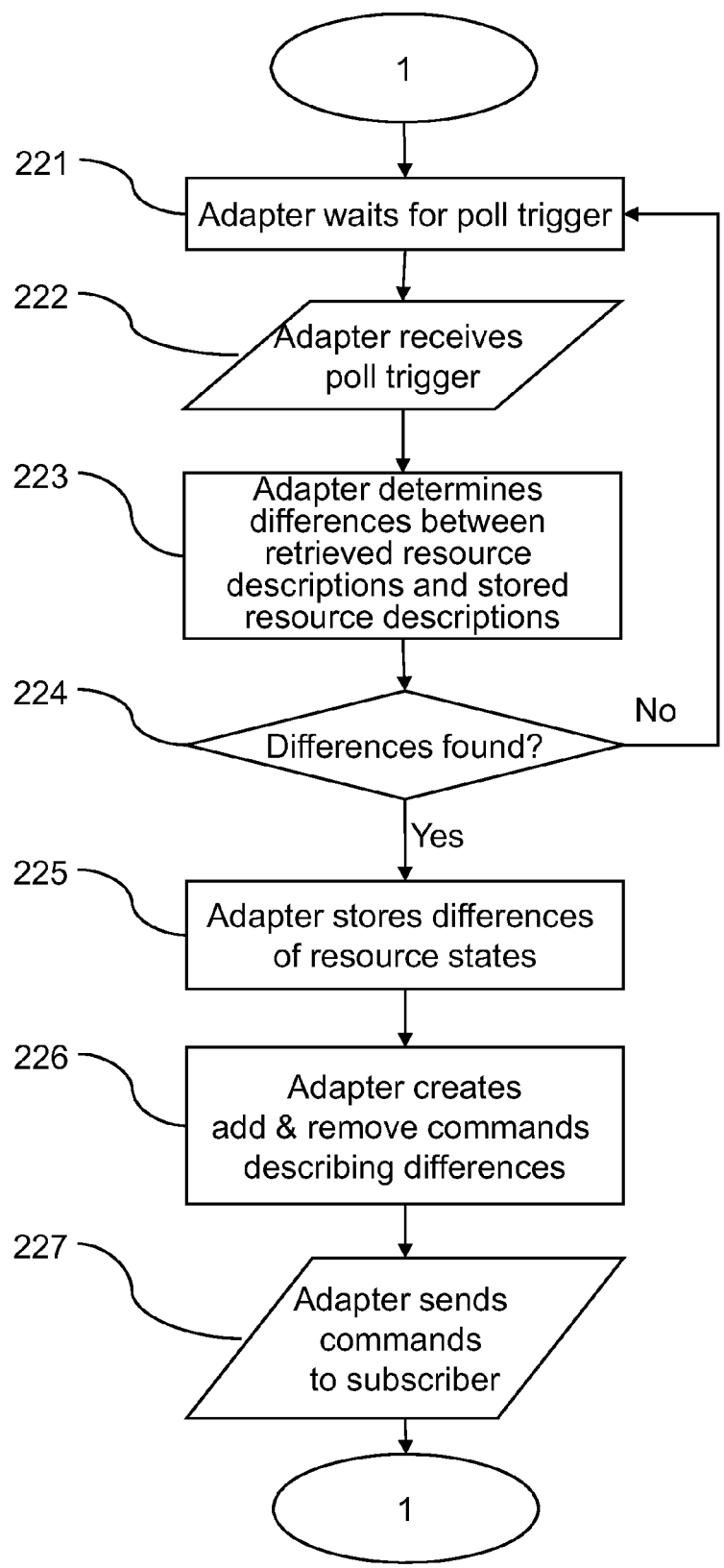

FIG. 2b presents a method showing how the automation adapter starts and stops polling resource descriptions of a set of resources upon receiving respective subscription and un-subscription requests from the controller. When the automation adapter receives (211) a subscription request, the automation adapter retrieves (212) complete initial resource descriptions of a subscribed set of resources from the automation domain and stores (212) the initial resource descriptions in an adapter local database. Then, the automation adapter creates (212) initial add commands related to the retrieved initial resource descriptions, and sends (213) the created initial commands to the controller of the subscribing automation engine. If the automation adapter has not yet received (214, "no") an un-subscription request, the adapter continues polling (215) the subscribed resources. The detailed sub-operations are illustrated in FIG. 2c. When the automation adapter has received (214, "yes") an un-subscription request, the automation adapter checks (216) if there are still subscribers. In the positive case (216, "yes"), the adapter continues (215) polling the subscribed resources. In the negative case (216, "no"), the adapter stops (217) polling the unsubscribed resources.

FIG. 2c shows the detailed operations of the polling (215) of FIG. 2b, according to some example embodiments. The automation adapter is waiting (221) for a poll trigger. The poll trigger can be a periodic trigger, a trigger initiated by certain changes of the technical resources of the automation domain, or a trigger actuated by a request of a system operating component. When the automation adapter receives (222) the poll trigger, the automation adapter retrieves (223) the current resource descriptions of the subscribed resources and determines (223) the differences between the retrieved current resource descriptions and the resource descriptions that have been stored (225, 212) in the adapter local database at a preceding poll cycle. When no differences are found (224, "No"), the automation adapter continues waiting (221) for the next poll trigger. In the case that differences between the retrieved current resource descriptions and the stored resource descriptions have been detected (224, "Yes"), the automation adapter stores (225) the differences in the adapter local database. The automation adapter creates (226) for the detected differences add or remove commands for respectively adding or removing respective statements from the knowledge base, and the automation adapter sends (227) the created commands to the controller of the subscribing automation engine.

Figure 2D:
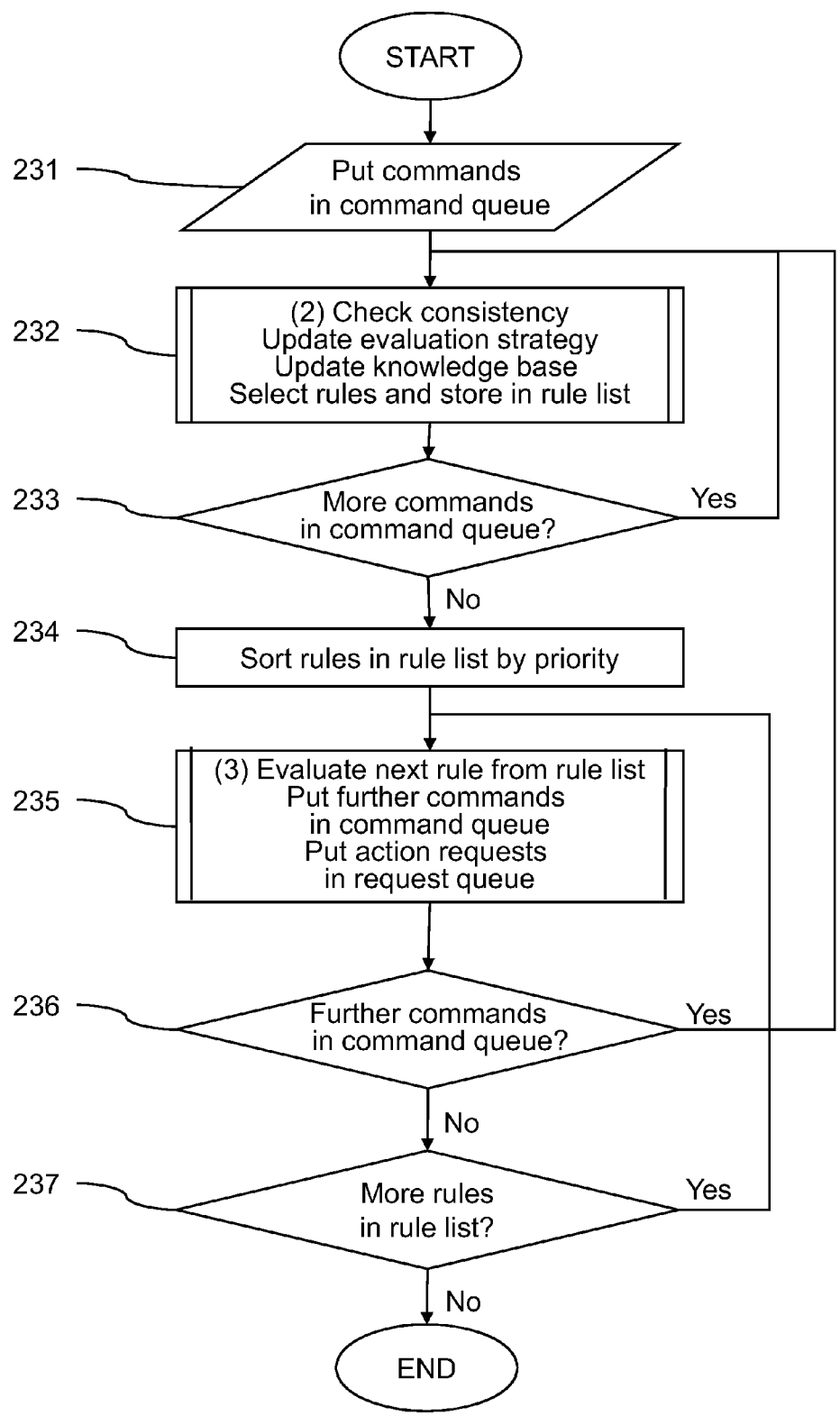
Figure 2E:
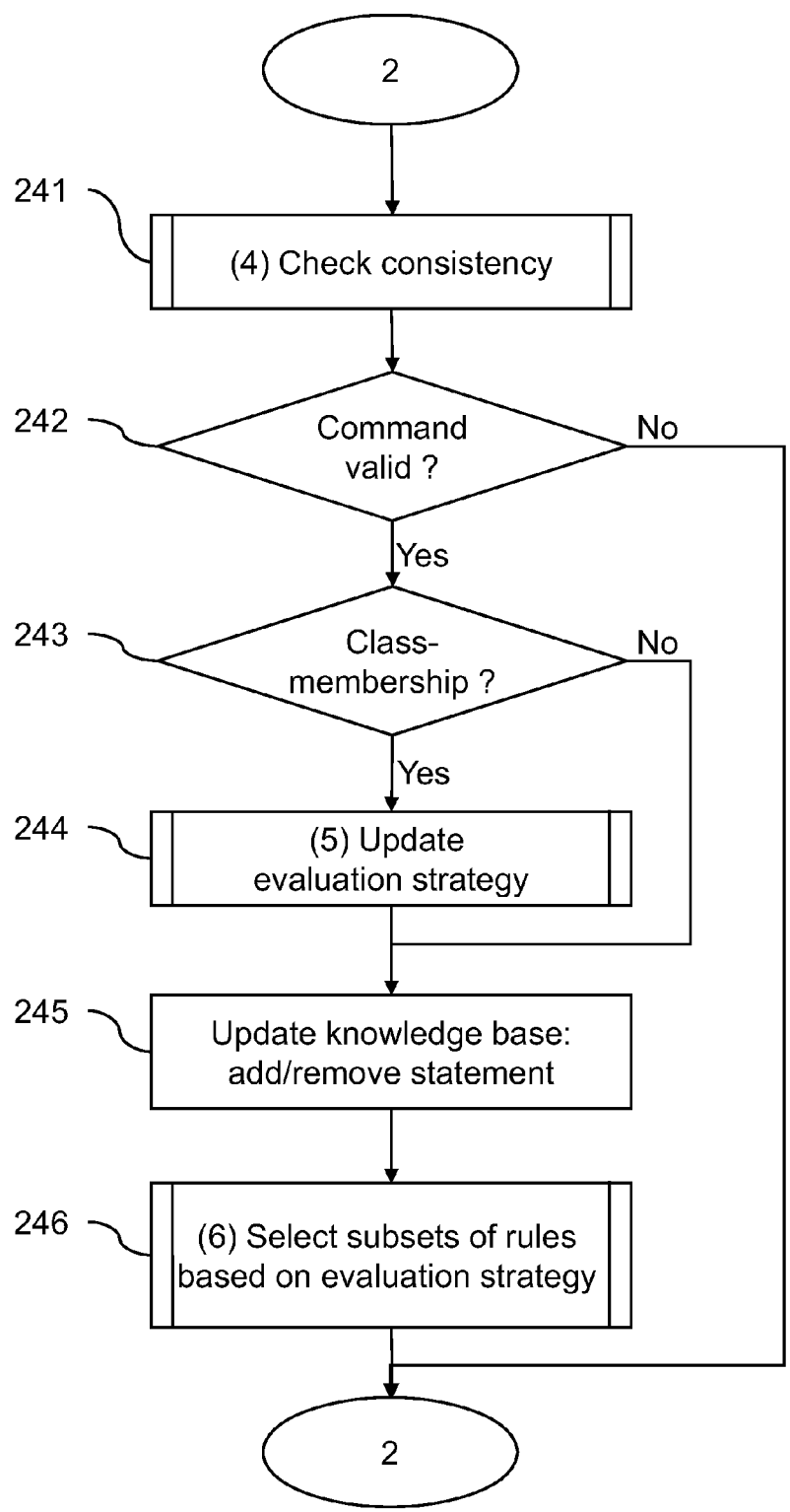
Figure 2F:
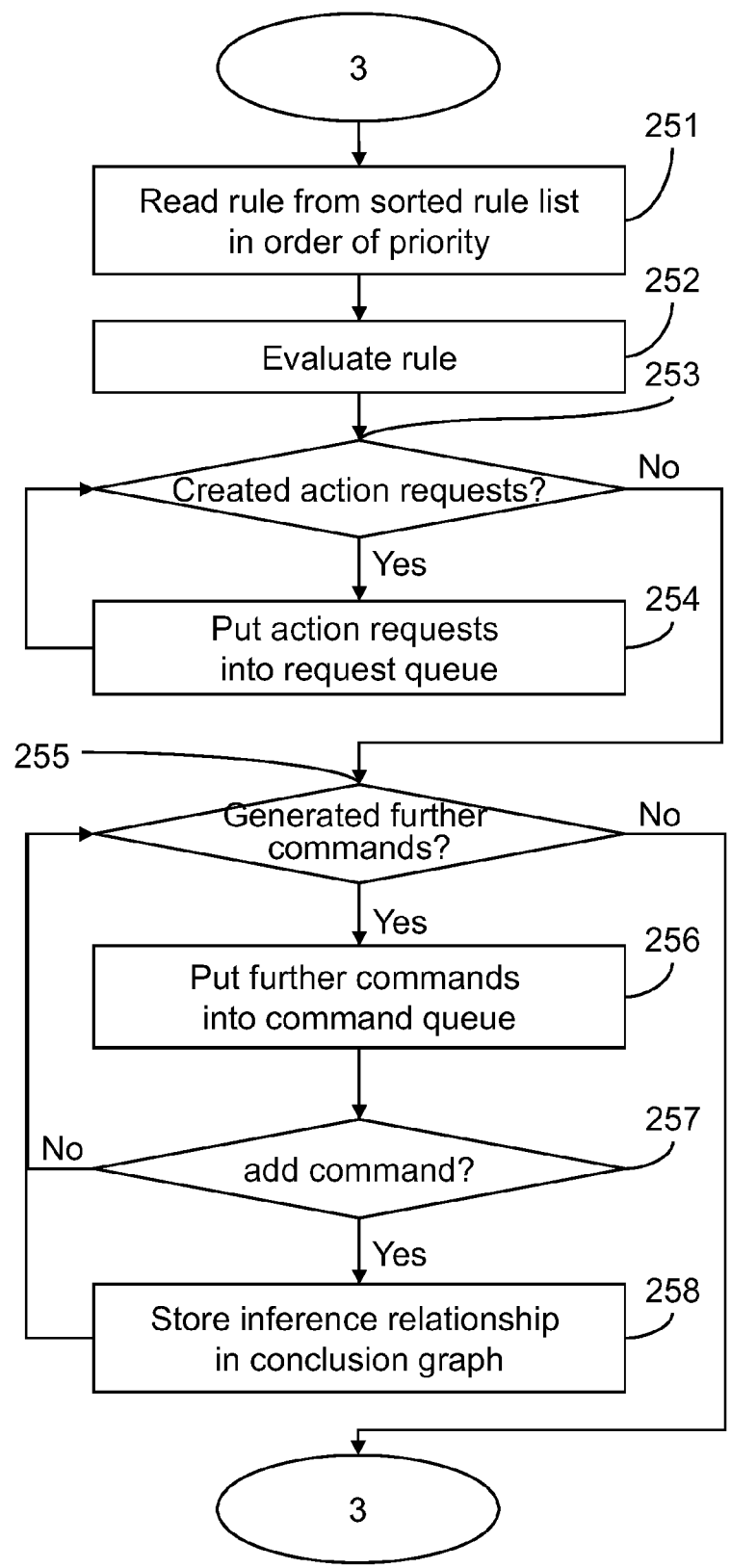

FIGS. 2d-2j illustrate a method performed by components of the automation engine. FIG. 2d shows the main loop of handling commands received by the controller. Before receiving commands from the automation adapter, the automation engine has an initial process state. Then, the controller puts (231) commands received from the automation adapter into the command queue. The consistency checker processes (232) a subsequent command from the command queue by checking certain constraints. The evaluation strategy updater updates (232) the evaluation strategy information. The process state updater of the automation engine updates the knowledge base. The rule selecting component of the automation engine selects rules from the evaluation strategy information, and stores them in the rule list. The detailed sub-operations are illustrated in FIG. 2e. The controller checks (233) if more commands are in the command queue. In the positive case (233, "Yes"), the controller processes a further subsequent command from the command queue and repeats the previous operation (232). In the negative case (233, "No"), the command queue is empty. The rule sorting component of the automation engine sorts (234) the rules in the rule list according to their pre-determined priorities. The semantic reasoner retrieves (235) a subsequent rule from the rule list in the determined sort order and evaluates the rule. Depending on a result of the rule evaluation, the reasoner can generate further commands, which are add or remove commands to be put into the command queue, or the reasoner can create action requests to be put into the request queue for submission to the automation adapter. The detailed sub-operations are shown in FIG. 2f. The controller checks (236) if further commands are to be processed. If the answer is (236, "yes") positive, the controller continues processing the generated commands in the same way as the commands received from the automation adapter. If no more further commands are (236, "no") waiting in the command queue, the reasoner checks (237) if more rules are waiting to be processed in the sorted rule list. In the positive case (237, "Yes"), the reasoner continues the evaluation of a further subsequent rule. In the negative case (237, "No"), both the rule list and the command queue are empty. Then, the automation engine has completed the transition to a final process state.

Figure 2G:
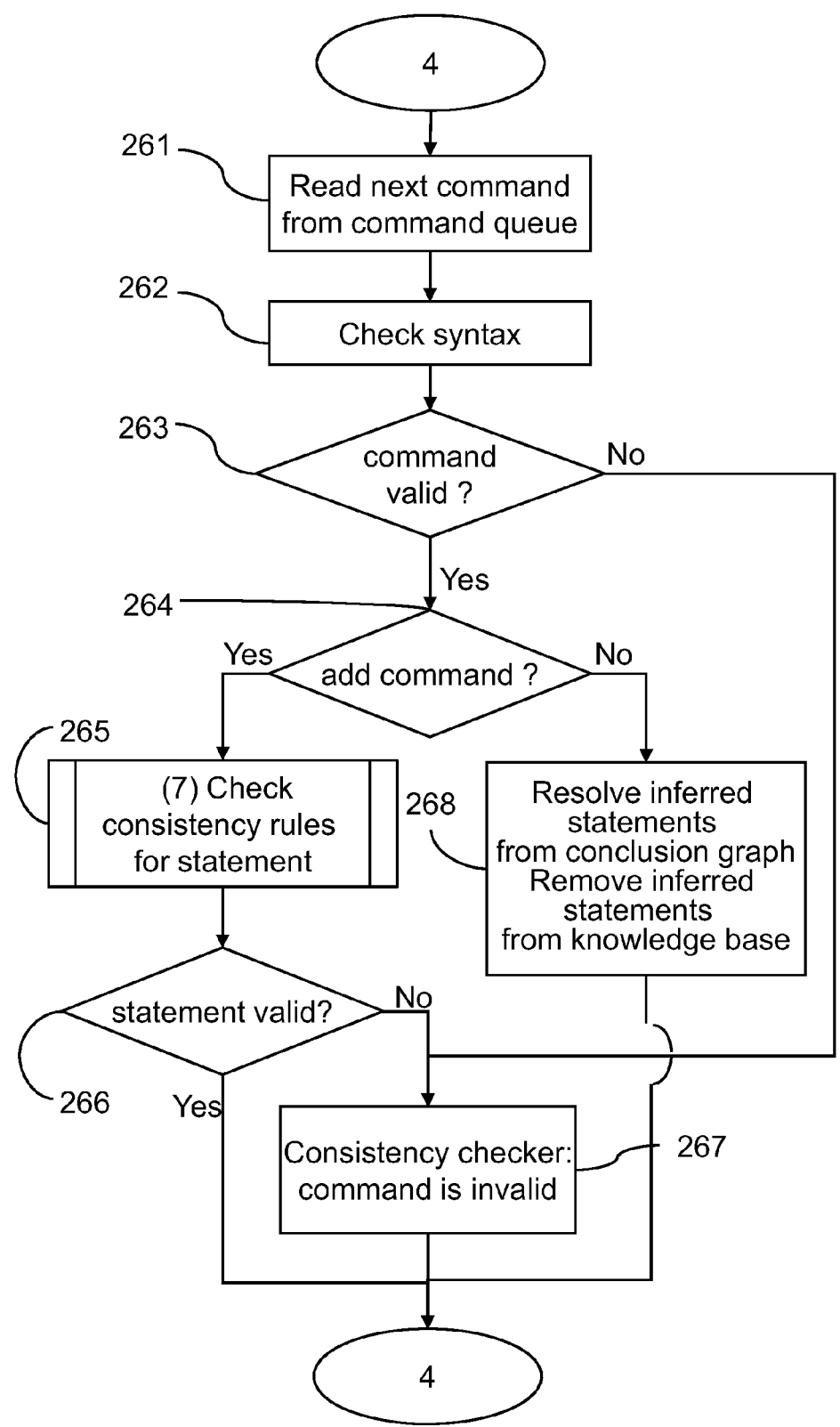
Figure 2H:
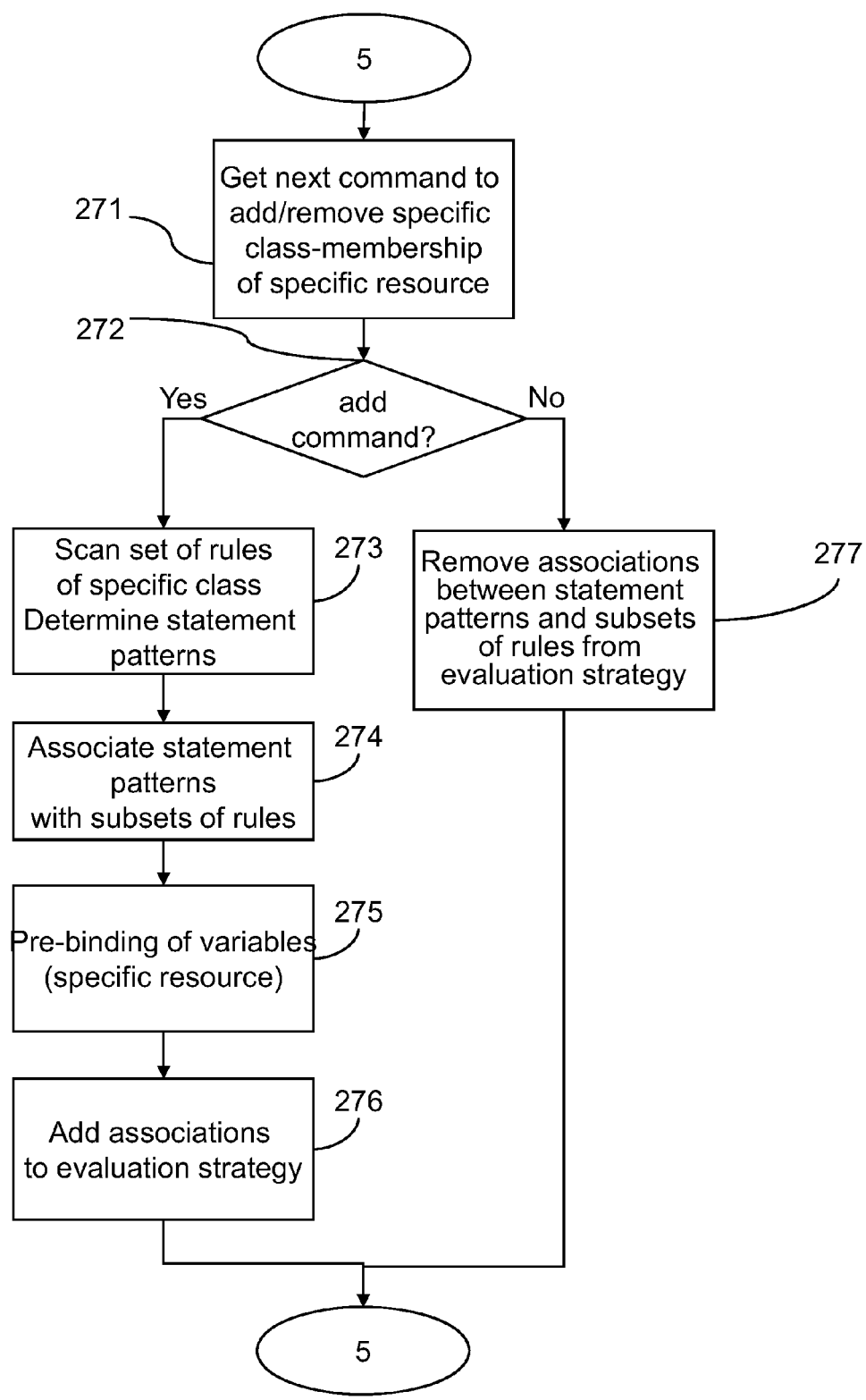
Figure 2I:
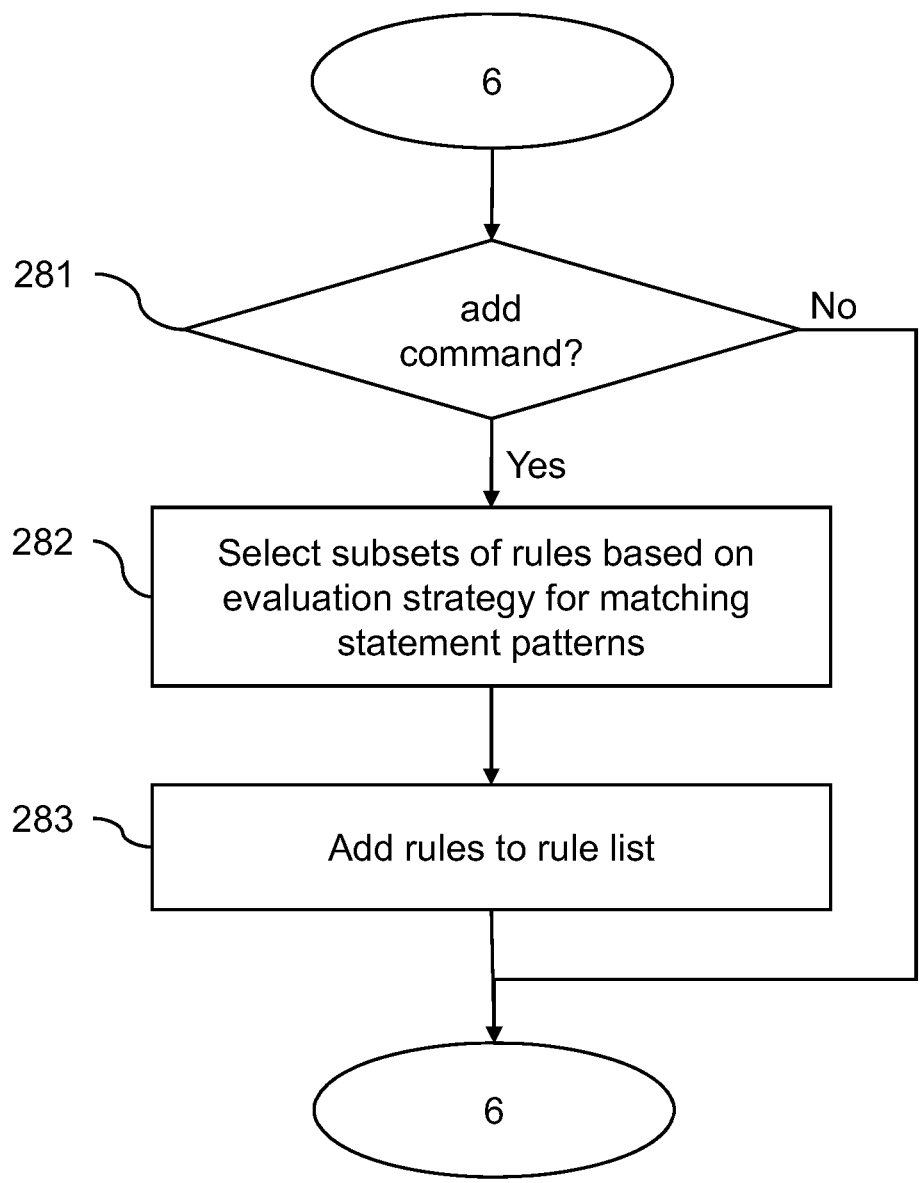

FIG. 2e displays detailed operations of the operation (232) of FIG. 2d for consistency checking, for updating the evaluation strategy information and the knowledge base, and for selecting rules and for storing them in the rule list. The sub-operations of checking (241) consistency are illustrated in FIG. 2g. The controller checks (242) if the command proved to be valid in the consistency check. In the negative case (242, "No"), the command is discarded. In the positive case, (242, "Yes"), the controller checks (243) if the command describes a class-membership of a resource. In the positive case (243, "Yes"), the evaluation strategy information is updated (244) due to a command assigning a resource to a class of the ontology. The sub-operations of updating (244) the evaluation strategy information are illustrated in FIG. 2h. If the command does not describe (243, "No") a class-membership, but a resource property, the controller skips the previous operation of updating (244) the evaluation strategy information. In both cases, the process state updater updates (245) the knowledge base by executing the add or remove command for respectively adding or removing a respective statement from the process state representation. The sub-operations of selecting (246) rules based on the evaluation strategy information are depicted in FIG. 2i.

FIG. 2f shows detailed operations of the operation (235) of FIG. 2d for evaluating a next rule from the rule list, for putting further commands into the command queue and for putting action requests into the request queue. The semantic reasoner reads (251) a next rule from the sorted rule list in the order of priority. Then, the reasoner evaluates (252) the read rule by selecting a subset of statements from the process state representation, binding unbound variables to respective parts of the selected statements, testing the rule head against one or more combinations of the selected statements, and executing at least one part of the rule body depending on a logical result of testing the rule head. The logical result can also cause no execution of any parts of the rule body. The execution of the rule body can comprise at least one of the following: generating further commands and generating action requests. When action requests have been created (253, "Yes"), the reasoner puts (254) the created action requests into the request queue. Otherwise (253, "No"), the reasoner tests (255) if further commands have been generated. In the positive case (255, "Yes"), the reasoner puts (256) the generated further commands in the command queue. The further commands are add commands for adding respective further statements to the knowledge base or remove commands for removing respective further statements from the knowledge base. If the further command is (257, "Yes") an add command, the reasoner stores (258) an inference relationship between a set of statements and the inferred statement of the further add command in a conclusion graph structure, where the subset of statements has been selected from the knowledge base and each of the selected statements matches at least one part of the rule head associated with the executed rule body.

Figure 2J:
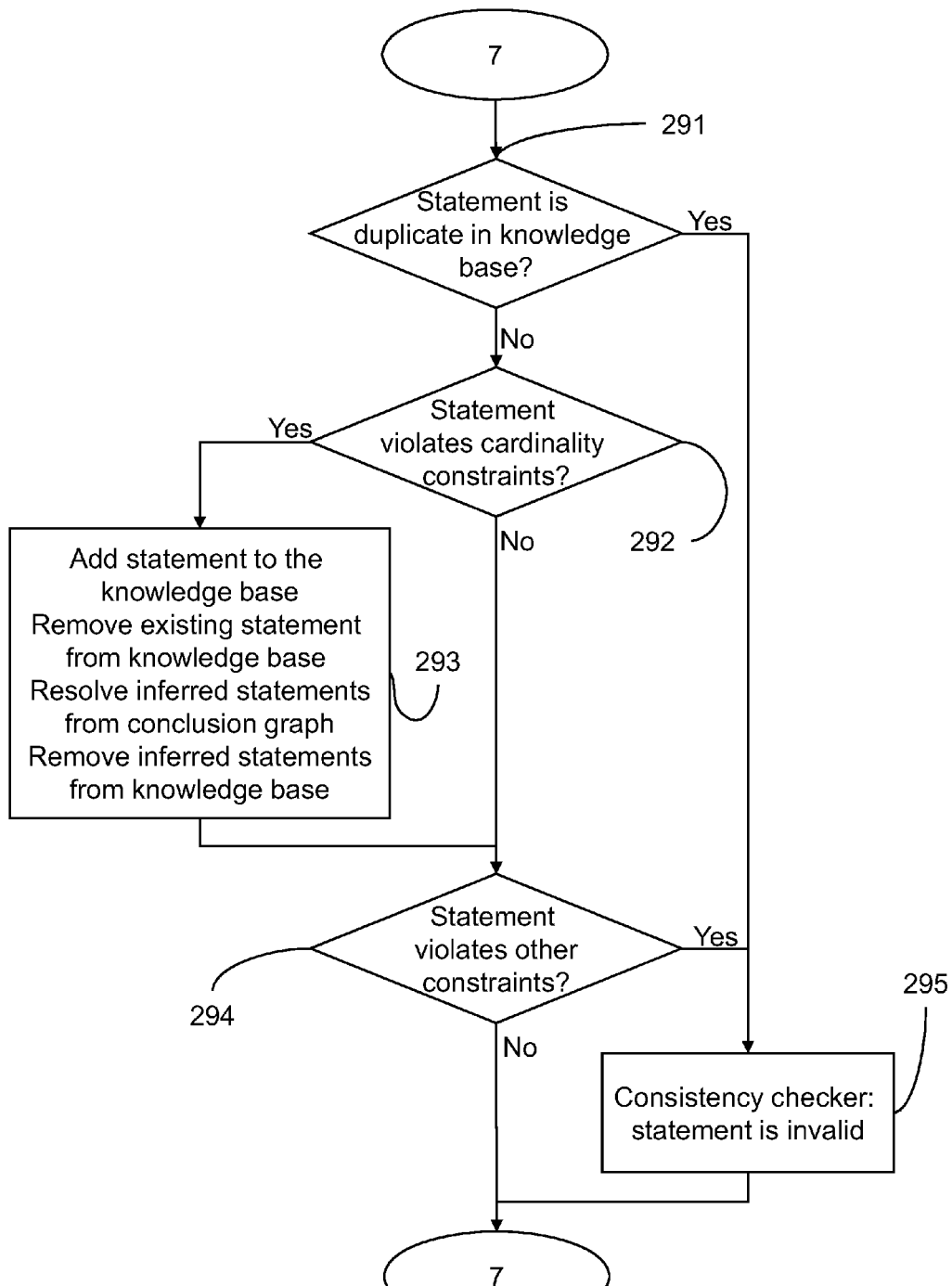

FIG. 2g illustrates detailed operations of the operation (241) of FIG. 2e for checking consistency. The controller reads (261) a next command from the command queue and the consistency checker performs (262) a general syntax check. If the command is (263, "Yes") valid, the consistency checker tests (264) if the command is an add command or a remove command. In the case of an add command (264, "Yes"), the sub-operations of checking consistency (265) rules for the respective statement are illustrated in FIG. 2j. The respective statement is tested (266) for validity. If the command is (263, "No") not valid or if the statement is (266, "No") not valid, the consistency checker concludes (267) that the command is invalid. In the case of a remove command (264, "No"), the consistency checker resolves (268) based on the conclusion graph structure a stored inference relationship between a subset of statements and an inferred statement when the statement to be removed from the knowledge base is a member of the subset of statements, removes the inferred statement from the knowledge base, and deletes the resolved inference relationship from the conclusion graph structure.

FIG. 2h illustrates detailed operations of the operation (244) of FIG. 2e for updating the evaluation strategy information. The evaluation strategy updater gets (271) a next command to add or remove a specific class-membership of a specific resource. In the case of an add command (272, "yes"), the evaluation strategy updater scans (273) the set of pre-determined rules of the specific class, determines (273) for each of the scanned rules a respective set of statement patterns from the respective rule head, and associates (274) each of the determined statement patterns with a respective subset of the determined rules. The evaluation strategy updater can be pre-binding (275) one or more of the variables of each rule to respective parts of statements. The pre-bound parts of statements can comprise the specific resource. The resulting information is added (276) to the evaluation strategy information. In the case of a remove command (272, "No"), the evaluation strategy updater removes (277) associations between statement patterns and respective subsets of rules from the evaluation strategy information when the associations have been added in response to a corresponding add command. To do this, the evaluation strategy updater can associate each of the stored rules with information specifying the specific resource and the specific class that caused to add the rule to the evaluation strategy information.

FIG. 2i illustrates detailed operations of the operation (246) of FIG. 2e for selecting subsets of rules based on the evaluation strategy information. The following operations are only performed in the case of an add command (281, "Yes"). The rule selecting component retrieves (282) subsets of rules from the evaluation strategy information when the respective statement patterns match the statement of the add command, and adds (283) the retrieved rules to the rule list.

FIG. 2j illustrates detailed operations of the operation (265) of FIG. 2g for checking consistency rules of a statement of an add command. The consistency checker searches (291) duplicate statements in the knowledge base. If the statement is (291, "Yes") duplicate, the consistency checker concludes (295) that the statement is invalid. Otherwise (291, "No"), the consistency checker checks (292) if the statement violates cardinality constraints. A cardinality "1" allows at most one value for a specific property of a specific resource. The specific property of the specific resource may have multiple values if the cardinality is "N". In the case of cardinality "1", a statement with the same specific resource and specific property is removed (293) from the knowledge base before adding the statement of the add command to the knowledge base. The consistency checker recursively resolves stored inference relationships between the removed statement and inferred statements based on the conclusion graph structure, recursively removes the inferred statements from the knowledge base and recursively deletes the resolved inference relationships from the conclusion graph structure. The consistency checker can check (294) violations of other constraints. If such violations exist (294, "Yes"), the consistency checker concludes (295) that the statement is invalid. Otherwise (294, "No"), the statement is considered to be valid.

FIGS. 3*a*-*f* illustrate a sample ontology and sample contents of data structures of the automation engine for an operations console system, according to some example embodiments. The automation system implements an operations console to ensure high availability of monitored applications and resources. A warning message is displayed at the operations console when a measured workload of monitored components exceeds a pre-determined threshold. The problem domain "operations console" uses the prefix "oc:" for the IT resources and their properties in the RDF statements. In this example, four properties are defined: The property "oc:workload" describes the workload of an application and has a pre-defined percentage range from 0 to 100. The property "oc:warning" indicates that an application has raised a warning when the value of the property "oc:warning" is "true". The property "oc:transaction" has the value "true" when an application performs an ongoing transaction. The value "true" of the property "oc:alert" indicates that an application has raised an alert and, for example, a blinking light is displayed at the operations console when a critical application performs a transaction and a warning is raised.

FIG. 3*a* shows four sample classes and rules of the first embodiment that are represented by an ontology: An application is assigned to the class "oc:RealtimeApplication" (301) when the application is required to respond within a pre-determined period of time. When an application belongs to the class "oc:NormalApplication" (303), response times are not important. Applications that are members of the class "oc:DispensibleApplication" (305) are not time-critical for the automation system. The class "oc:CriticalResource" (307), however, comprises all resources that are time-critical. A "Rule 1" (302) is associated with the class "oc:RealtimeApplication" (301) and means that a warning is raised for an application instance of the class when the workload exceeds 60 percent. A "Rule 2" (304) is a member of the class "oc:NormalApplication" (303) and means that a warning is raised for an application instance of the class when the workload exceeds 95 percent. The class "oc:DispensibleApplication" (305) does not comprise any rules. "Rule 3" (308) is associated with the class "oc:CriticalResource" (307) and has the meaning that an alert is raised if a workload warning occurs and if a transaction of an application instance is ongoing. "Rule 4" (310) is associated with a superclass "oc:Resource" (309), that is, the rule can be applied to all resources. This rule (310) does not refer to the properties of resources but to the class-membership of resources. The RDF statements describing class-memberships have, for example, the predicate "rdf:type". "Rule 4" (310) has the following meaning: When an application is member of the class "oc:RealtimeApplication", the application is also member of the class "oc:CriticalResource", that is, the class "oc:RealtimeApplication" is a subclass of the class "oc:CriticalResource".

The following example uses sample contents for the following data structures to illustrate the method according to the first embodiment: the command queue, the evaluation strategy table, the rule list, the knowledge base table, and the conclusion table at 12 points of time, T=0, 1, . . . 11.

FIG. 3*b* shows entries of the command queue. Each entry is an "add" or a "remove" command of a statement that comprises a subject, predicate, and object, which respectively represent a resource, a property of the resource, and another resource or data value respectively linked to the resource.

FIG. 3*c* illustrates entries of the evaluation strategy table, where each entry has a "statement pattern" and a "subset of rules". The statement pattern can comprise a "changed resource" and a "changed property". "Class-membership" statement patterns further comprise a "changed value", which is not used to match statements describing "resource properties". In the shown cases, there is only one rule per entry. Each rule can have at least one pre-binding of a variable, which can comprise a pre-binding of the changed resource of the statement pattern to one of the variables. The entry (341) does not have a pre-binding, but the entries (342, . . . , 345) do have pre-bindings of resources, for example, "oc:app1" and "oc:app2", to the variable "?x". In a typical environment, each entry of the evaluation strategy table has more than one rule.

FIG. 3*d* depicts the rule list. Each entry of the rule list contains a selected rule of the subset of rules, a rank of the selected rule, and at least one pre-binding of a variable. The rules are read from the rule list and evaluated in an order of the rank. This means, that a rule entry with rank=1 is evaluated before a rule entry with rank=9, because rank=1 has a higher priority than rank=9.

FIG. 3*e* shows the knowledge base table with statements representing the process state of the automation engine. Each entry specifies a resource, a datatype property or a value property, and, respectively, another resource or a data value.

FIG. 3*f* illustrates the conclusion table. Each table entry specifies a statement matching a part of a rule head of a rule, an add command generated by the rule, and an inferred statement associated with the generated add command. If a rule head has more than one matching statement, the conclusion table contains multiple entries (393, 394) for one command generated by the rule.

At the beginning of the sample scenario, T=0, a basic ontology with generic class and rule definitions is stored in the knowledge base. The evaluation strategy table is initialized with generic rules that are applied to all resources. One of these rules is "Rule 4" (310), which has been inserted at row (341) of the evaluation strategy table.

At T=1, the automation adapter sends the first add command (321), which describes a class-membership of resource "oc:app1", to the automation engine, where the command is put into the command queue. For the specific resource "oc:app1" and the specific class "oc:RealtimeApplication" (301), the evaluation strategy updater determines the statement pattern "(?x oc:workload *)", which from the rule head of "Rule 1" (302) and pre-binds the variable "?x" to the specific resource "oc:app1". In the remainder, the asterisk wildcard for the third part of the statement pattern is not written any more. Thus, a simplified representation of the statement pattern reads "(?x oc:workload)". The evaluation strategy updater stores information about the association (342) between the determined statement pattern "(oc:app1oc:workload)" and the "Rule 1", where the variable "?x" has been pre-bound to the resource "oc:app1" in the evaluation strategy table. While processing the command (321) from the command queue, the knowledge base is updated by inserting the respective statement (381). The "Rule 4" in row (341) is selected based on the evaluation strategy table because the command (321) matches the changed property "rdf:type" and the changed value "oc:RealtimeApplication". A corresponding entry (361) for "Rule 4" with pre-binding "?x=oc:app1" is inserted into the rule list. Since there is only one entry in the rule list, sorting is not necessary. The reasoner gets this entry (361) from the rule list and evaluates "Rule 4" (310) with pre-binding "?x=oc:app1". The evaluation of "Rule 4" (310) generates a further command (322) that assigns the resource "oc:app1" to the class "oc:CriticalResource". The reasoner inserts an entry (391) into the conclusion table, where the entry specifies the statement (381) from the knowledge base and the generated further command (322). The statement (381) is the only one that matches the rule head of "Rule 4". The generated further command (322) is inserted into the command queue. The evaluation strategy updater processes this add command for a class-membership: it determines from the rule head of "Rule 3" (308) of the specific class "oc:CriticalResource" (307) two statement patterns, "(?x oc:warning)" and "(?x oc:transaction)", pre-binds the variable "?x" to the specific resource "oc:app1", and adds information about the respective associations (343, 344) between the statement patterns and "Rule 3" to the evaluation strategy table. The statement (382) associated with the generated add command (322) is added to the knowledge base and the respective entry (391) of the conclusion table is updated with a reference to the statement (382). This entry (391) describes an inference relationship between the parent statement (381) and the inferred child statement (382). In the evaluation strategy table, no matching entries can be selected for the changed property "rdf:type" and the changed value "oc:CriticalResource". Since the command queue and the rule list are empty, the automation engine is in a temporary final state and ready to receive new commands.

At T=2, the automation engine receives more commands (323, . . . , 328) from the automation adapter and puts them into the command queue. These commands are respectively describing class-memberships (323, 324) and properties (325, . . . , 328) of resources. In the command queue, class-membership commands precede resource property commands when both types of commands are associated with the same resources to make sure that the evaluation strategy is updated BEFORE selecting and evaluating rules. The evaluation strategy updater processes the command (323), which assigns the resource "oc:app2" to the class "oc:NormalApplication": From the rule head of "Rule 2" (304) of the class "oc:NormalApplication" (303), the evaluation strategy updater determines the statement pattern "(?x oc:workload)", pre-binds the variable "?x" to the specific resource "oc:app2", and inserts a corresponding entry (345) into the evaluation strategy table. This entry (345) associates the statement pattern "(?x oc:workload)" and the "Rule 2" with a pre-binding "?x=oc:app2". The command (324) assigns the resource "oc:app3" to the class "oc:DispensibleApplication" (305). This class is not associated with rules so that the evaluation strategy updater does not add any entries for the resource "oc:app3" into the evaluation strategy table. The commands from the command queue are processed before the evaluation of rules is started. The next command (325) in the command queue is a resource property command. The evaluation strategy table is not updated for these commands (325, . . . , 328). A lookup for the command (325) in the evaluation strategy table matches the statement pattern of row (342), which has the changed resource "oc:app1" and the changed property "oc:workload". The data value "79" of the received command (325) does not have to match the statement pattern of row (342) because the "changed value" column in the evaluation strategy table has a wildcard "*". As a result of this lookup, an entry (362) for "Rule 1" with the pre-binding "?x=oc:app1" is inserted into the rule list. The lookup for the next command (326) retrieves row (344) from the evaluation strategy table and inserts row (363) into the rule list. The next command (327) in the command queue matches row (345) of the evaluation strategy table, which is selected and stored in a rule list entry (364). For the last command (328) in the command queue, the evaluation strategy table does not contain any matching statement patterns, and no entry is inserted into the rule list. All the received commands (323, . . . , 328) are executed by adding the respective statements (387, 390, 383, 384, 388, 389) to the knowledge base table.

At T=3, no more commands are waiting to be processed from the command queue, and the reasoner can start evaluating the rules (362, 363, 364) from the rule list. Before the evaluation, the reasoner sorts the entries in the order of the rank, that is, firstly, entry (362) with rank=2, secondly, entry (364) with rank=2, and thirdly, entry (363) with rank=9. The evaluation of "Rule 1" (302) from the entry (362) tests the condition "(oc:app1oc:workload >60)" by retrieving statement (383) from the knowledge base, which has a value of "79" and fulfills the condition of the rule head. Then, the rule body of "Rule 1" is executed and a further add command (329) for the statement "(oc:app1oc:warning true)" is generated. A new entry (392) for the statement (383) and the generated add command (329) is inserted into the conclusion table. The add command (329) is put into the command queue.

At T=4, since the command queue contains the generated add command (329) and is not empty, the reasoner does not continue to evaluate rules from the rule list. A lookup for the command (329) from the evaluation strategy table returns entry (343) specifying "Rule 3" (308) with pre-binding "?x=oc:app1". For "Rule 3" and the pre-binding "?x=oc:app1", a duplicate entry (363) already exists in the rule list and the selected rule from entry (343) of the evaluation strategy table is ignored. The respective statement (386) of the generated add command (329) is added to the knowledge base and the respective entry (392) of the conclusion table is updated.

At T=5, the command list is empty again, the entries of the rule list are still sorted, and the reasoner can continue to process commands from the rule list in the order of the rank. The next entry (364) with rank=2 triggers the evaluation of the "Rule 2" (304) with pre-binding "?x=oc:app2". To test the corresponding rule head, the reasoner retrieves statement (388) from the knowledge base and tests the condition "(oc:app2oc:workload >95)". Since the retrieved value is "83" and not ">95", the evaluation of the rule head returns false and the rule body of "Rule 2" is not executed.

At T=6, the rule list has only one entry (363) left. To evaluate "Rule 3" (308) with pre-binding "?x=oc:app1", the reasoner selects the statements (384) and (386) from the knowledge base, which both satisfy the condition of the corresponding rule head. The execution of the corresponding rule body generates the add command (330). Since the test of the rule head requires two statements (384) and (386) from the knowledge base, two respective entries (393) and (394) are inserted into the conclusion table. Each of both entries specifies the generated command (330), which is added to the command queue.

At T=7, the command queue contains the command (330) and the respective statement (385) is added to the knowledge base. In the conclusion table, a reference to the statement (385) is added to the entries (393) and (394). In the evaluation strategy table, no matching rules are found for the changed resource "oc:app1" and the changed property "oc:alert". The command queue and the rule list are empty again. The automation engine has reached a temporary final state.

At T=8, the automation engine receives a remove command (331) for a resource property from the automation adapter. The respective statement (384) is removed from the knowledge base table. The consistency checker resolves based on the conclusion table a stored inference relationship (393) for the statement (384) to be removed and generates a further remove command (332) to remove the inferred statement (385) from the knowledge base. Instead of generating a remove command to be put into the command queue, the consistency checker could alternatively remove the inferred statement (385) in a direct way. Furthermore, the consistency checker deletes from the conclusion table the respective entries (393, 394) of the inference relationship associated with the inferred statement (385) to be removed. A lookup in the evaluation strategy table for the remove command (331) with the changed resource "oc:app1" and the changed property "oc:transaction" returns the entry (344) for "Rule 3" with pre-binding "?x=oc:app1." A corresponding entry (363) is added to the rule list again.

At T=9, the controller of the automation engine reads the remove command (332) from the command queue. The process state updater removes the respective statement (385) from the knowledge base. For the statement (385), the consistency checker does not find any further inferred statements in the conclusion table so that there is no need to generate further remove commands. When the automation engine tries to select based on the evaluation strategy table a matching entry for the changed resource "oc:app1" and the changed property "oc:alert" of the command (332), it does not find any.

At T=10, the command queue is empty again. The rule list contains the entry (363). The reasoner evaluates "Rule 3" (308) with pre-binding "?x=oc:app1". Since the statement (384) for the resource "oc:app1" and the property "oc:transaction" has been removed from the knowledge base, the first part of the rule head of "Rule 3", that is, "(oc:app1 oc:warning true)", cannot be satisfied. The rule evaluation returns a logical result "false", and the rule body of "Rule 3" is not executed. The rule list is empty again. The automation engine has reached a further temporary final state.

At T=11, the automation engine receives the remove command (333) for the membership of the resource "oc:app2" in the class "oc:NormalApplication". The evaluation strategy updater determines for the "Rule 2" (304) of the class "oc:NormalApplication" (303) one entry (345) in the evaluation strategy table that refers to the resource "oc:app2" and removes this entry (345). The process state updater deletes the statement (387), which assigns the resource "oc:app2" to the class "oc:NormalApplication", from the knowledge base. The statement (388) for the property "oc:workload", however, is still maintained in the knowledge base because the resource "oc:app2" could be a member of another class. The consistency checker does not find any inference relationships that are using statement (387) so that no further remove commands are generated. The rule selecting component can neither select any entries for the changed property "rdf:type" and the changed value "oc:NormalApplication" from the evaluation strategy table. Since the command queue and the rule list are both empty again, the automation engine is again in a temporary final state.

FIGS. 4a-g illustrate sample resource graphs and rule graphs for a server automation system, according to some example embodiments. The problem domain "server automation" uses the prefix "sa:" for the IT resources and their properties in the RDF statements. The sample automation system comprises three resources: a database "sa:db" and two servers, "sa:serv1" and "sa:serv2". Both servers are members of a server group "sa:servgrp". The prefixes "rdf:", "rdfs:", and "owl:" are used for IT resources and their properties that are respectively defined by the Resource Description Framework (RDF), RDF Schema, and the OWL Web Ontology Language (OWL).

A basic element of a graph includes two nodes represented by circles and a connection line between the two nodes. The two nodes represent the subject and the object of the statement and the connection line represents the predicate. A multi-graph represents multiple interlinked statements by multiple interconnected circles.

Figure 4A:
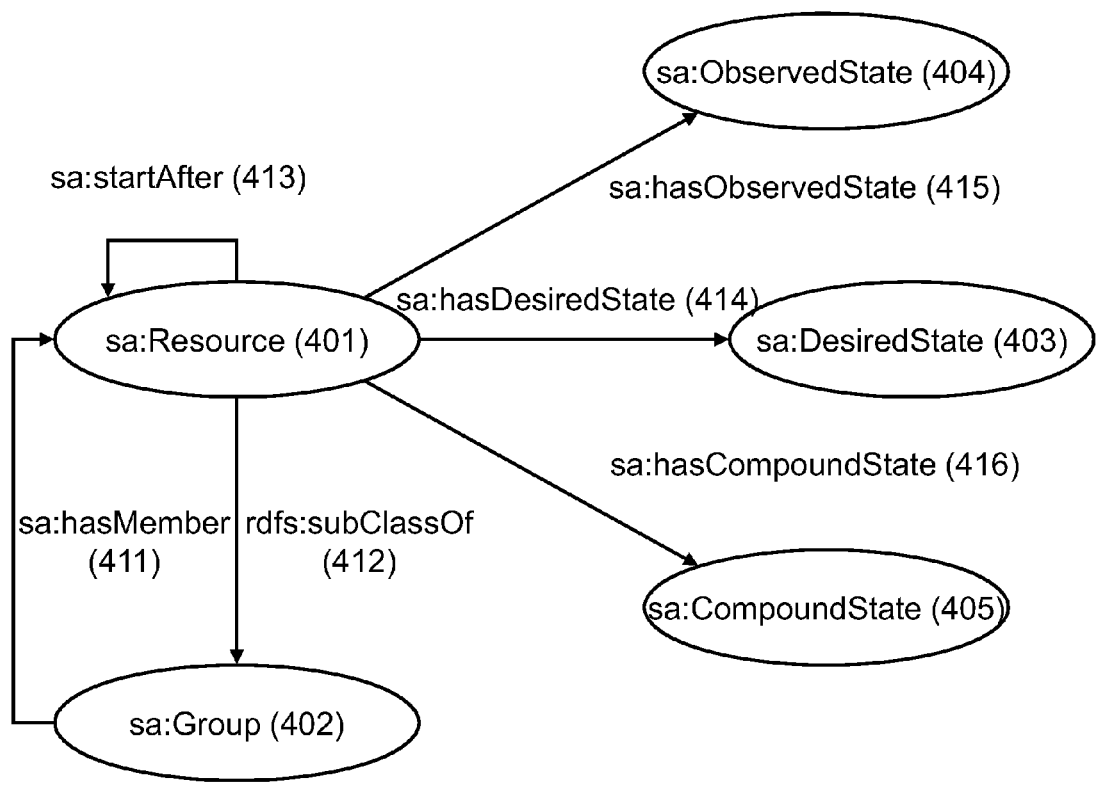
FIGS. 4a-g illustrate sample resource graphs and rule graphs for a server automation system, according to some example embodiments.

FIG. 4a shows one multi-graph with five nodes representing concepts of the ontology: The node "sa:Resource" (401) and the node "sa:Group" (402) are both subjects and objects of statements, for example, "(sa:Group sa:hasMember sa:Resource)" (411) and "(sa:Resource rdfs:subClassOf sa:Group)" (412). The properties "sa:hasMember" and "rdfs:subClassOf" are both object properties because they link resources. The nodes "sa:ObservedState" (404), "sa:DesiredState" (403), and "sa:CompoundState" (405) are only objects of one statement, for example, the statement "(sa:Resource sa:hasObservedState sa:ObservedState)" (415).

Figure 4B:
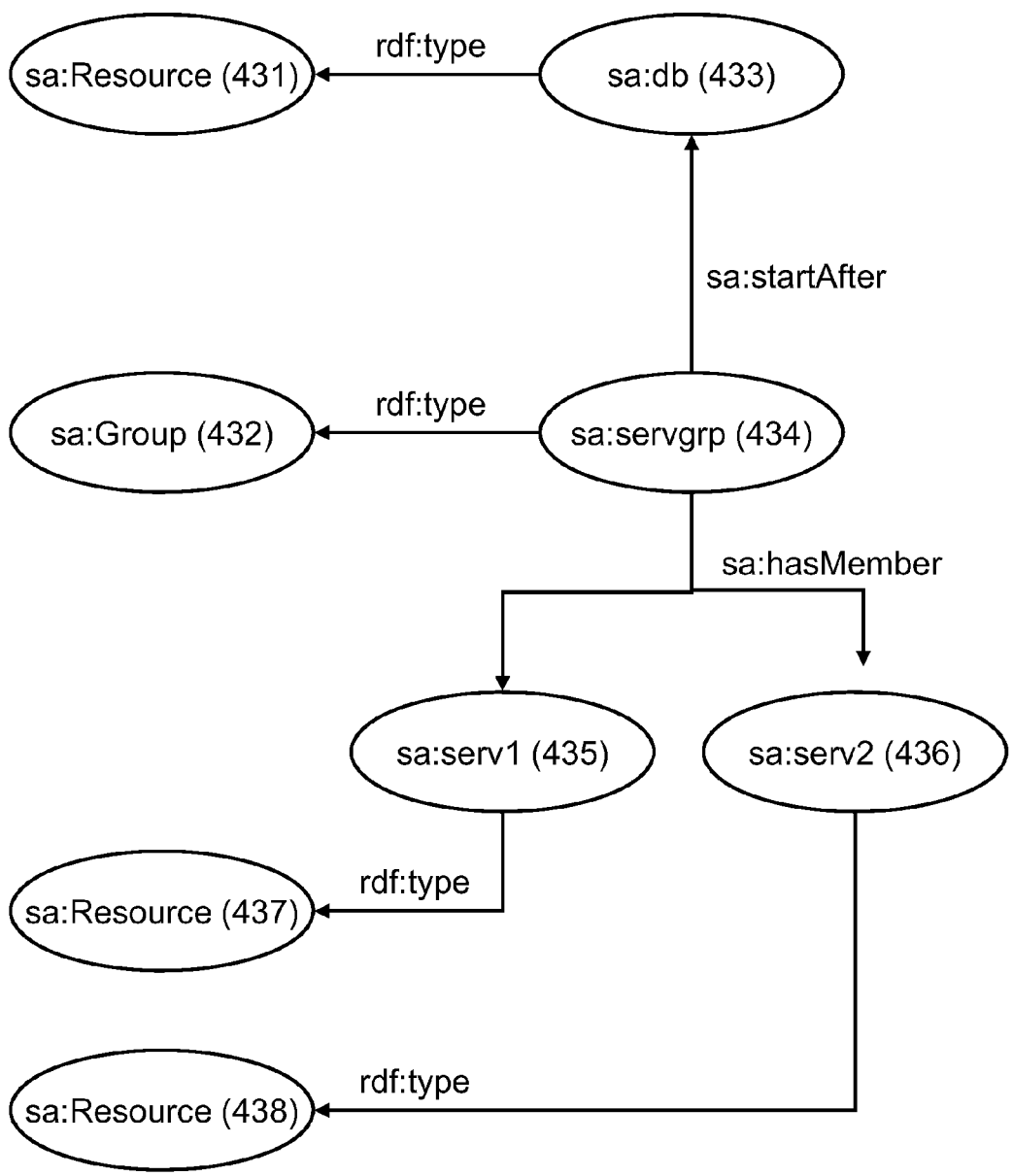

FIG. 4b illustrates a multi-graph representing concepts and individuals: For example, the node "sa:Group" (432) and the nodes "sa:Resource" (431,437,438) are concepts, and "sa:serv1" (435) and "sa:serv2" (436) are respective individuals, which are connected by statements, for example, "(sa:servgrp rdf:type sa:Group)" and "(sa:serv1 rdf:type sa:Resource)". When a statement links two concepts, such as the statement "(sa:Group sa:hasMember sa:Resource)", inferred respective individuals are linked by a corresponding statement, for example, "(sa:servgrp sa:hasMember sa:serv1)". When a relationship exists between two individuals and at least one of them is a group, the relationship is also deduced for the members of the group. For example, from the statement "(sa:servgrp sa:startAfter sa:db)" the statements "(sa:serv1 sa:startAfter sa:db)" and "(sa:serv2 sa:startAfter sa:db)" are inferred because of the member relationship statements "(sa:servgrp sa:hasMember sa:serv1)" and "(sa:servgrp sa:hasMember sa:serv2)".

Figure 4C:
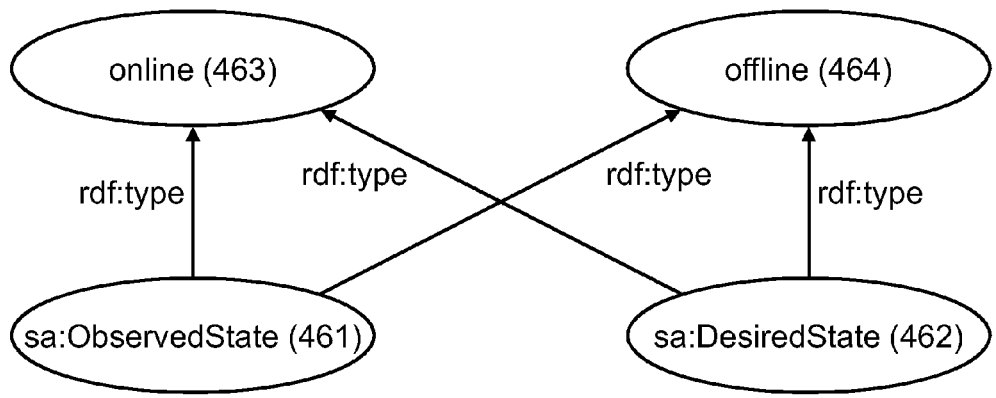
Figure 4D:
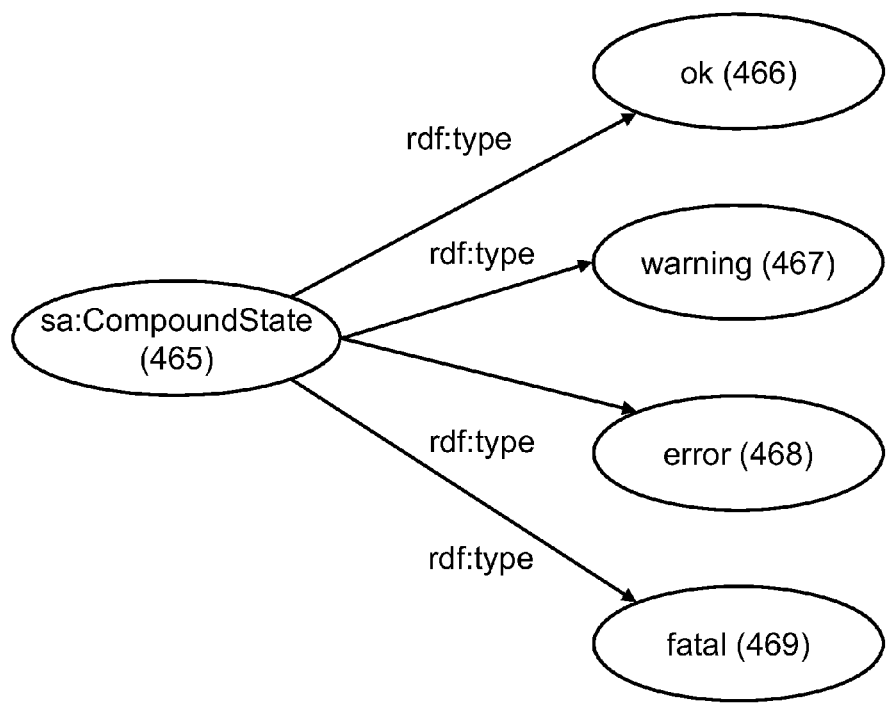

FIGS. 4c and 4d depict two multi-graphs representing only individuals. The individuals are resources, for example, "sa:ObservedState" (461), "sa:DesiredState" (462), and "sa:CompoundState" (465). The respective values of the resources are, for example, "online" (463) and "offline" (464) or "ok" (466), "warning" (467), "error" (468), and "fatal" (469).

Figure 4E:
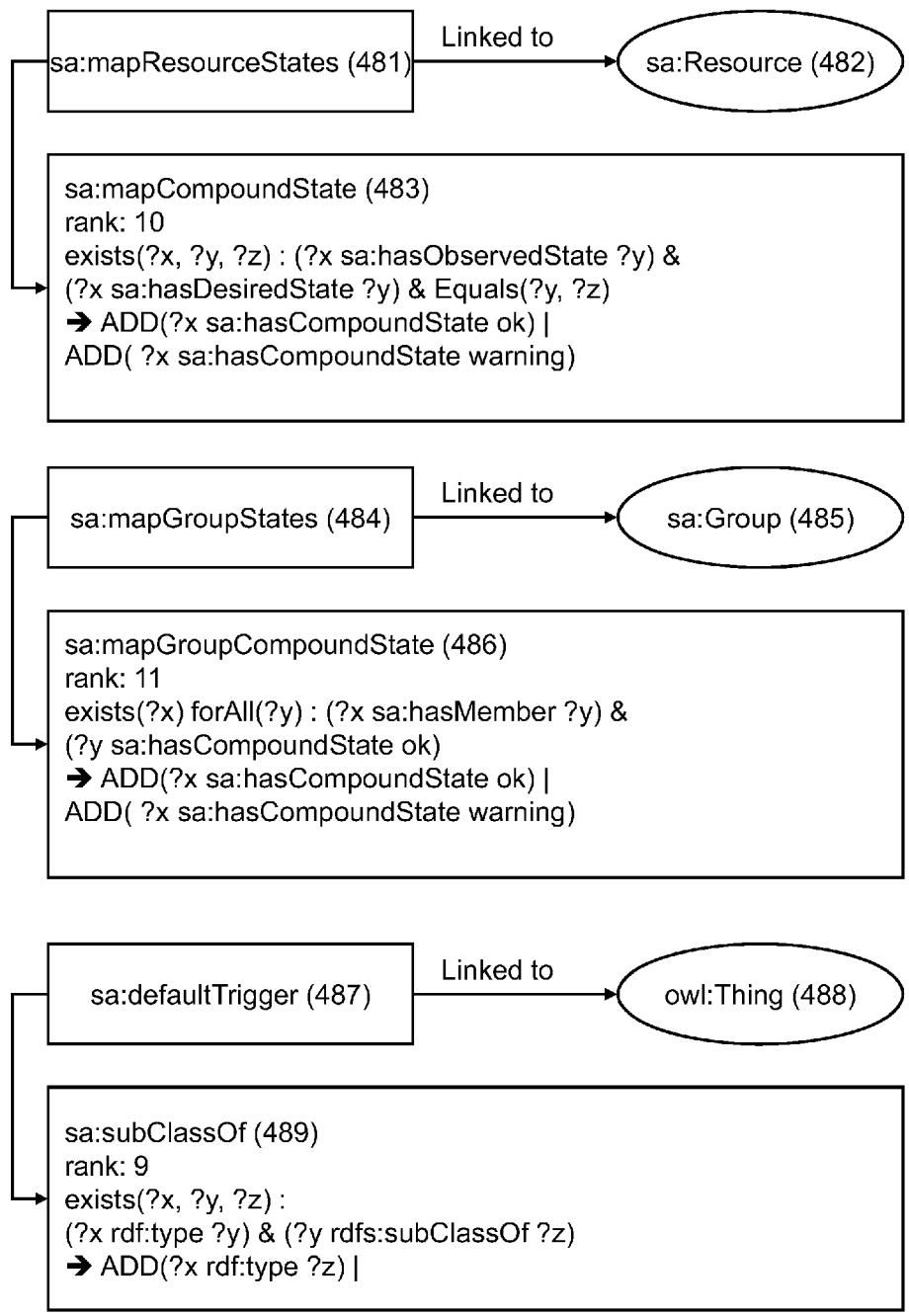
Figure 4F:
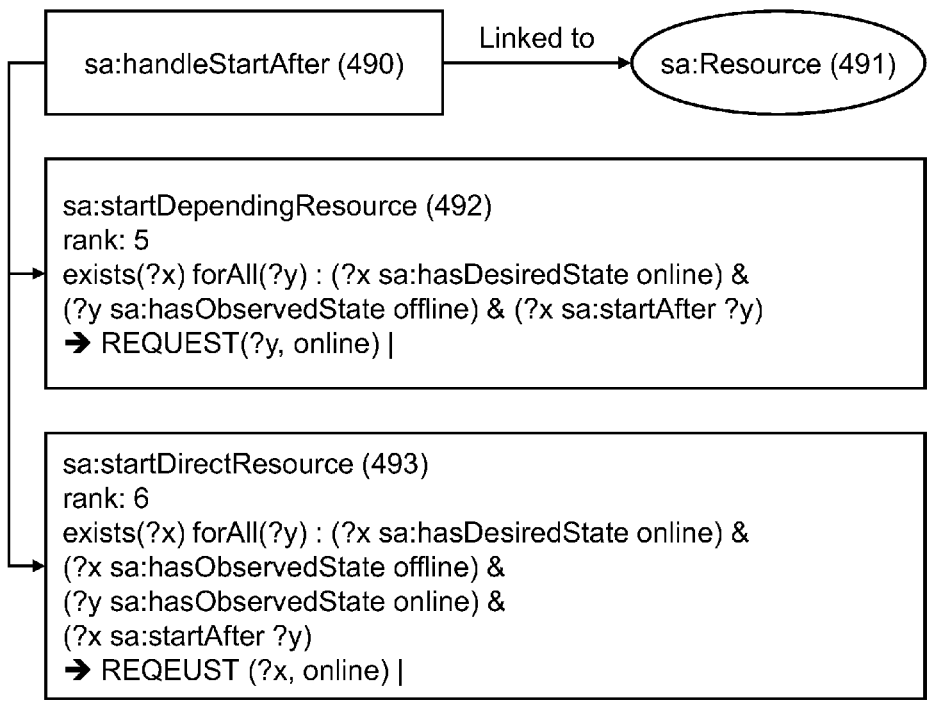
Figure 4G:
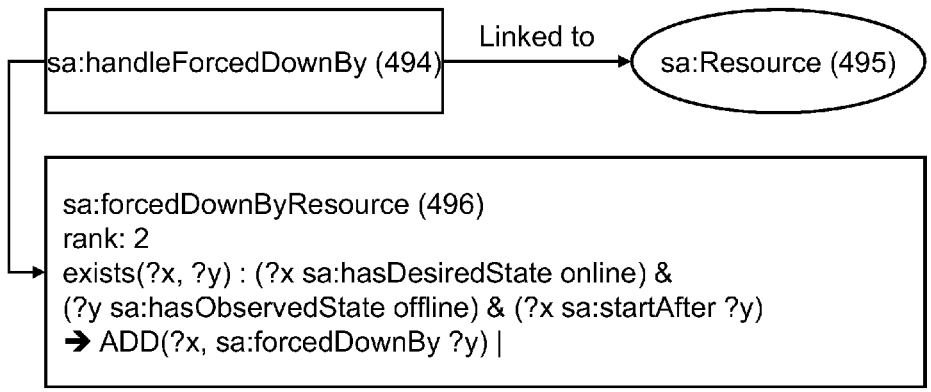

FIGS. 4e to 4g show the following examples of concept rules, which refer to concepts, such as "sa:Resource" (482, 491), "sa:Group" (485), and "owl:Thing" (488): "sa:mapResourceStates" (481), "sa:mapGroupStates" (484), sa:defaultTrigger (487), "sa:handleStartAfter" (490), and "sa:handleForcedDownBy" (494). From each of the concept rules, at least one individual rule is determined For example, "sa:mapCompoundState" (483) is an individual rule of the concept rule "sa:mapResourceStates" (481). The rules can comprise the following components:
 a name, for example, "sa:mapCompoundState",
 a rank, for example, an integer value "10",
 a rule head,
 at least one of the following quantors: an exists quantor and
  an all quantor, and
 a rule body.

The rule head comprises at least one statement pattern. In the evaluation strategy table, for each of the rules, one or more variables can be pre-bound to respective resources. Typically, at least the resource that has been assigned to a class associated with the rule is pre-bound to the corresponding variable. For example, the rule "sa:mapCompoundState" (483) has a pre-binding "?x=sa:serv1" for the variable "?x", but not for the variables "?y" and "?z", which results in the following rule head: "(sa:serv1 sa:hasObservedState ?y) & (sa:serv1 sa:hasDesiredState ?z) & Equals(?y, ?z)". The evaluation of the rule head retrieves all matching statements from the knowledge base, that is, all statements that match the select patterns "(sa:serv1 sa:hasObservedState *)" and "(sa:serv1 sa:hasDesiredState *)". Because the properties "sa:hasDesiredState" and "sa:hasObservedState" have a cardinality of "1", there will be at most one statement for each of the statement patterns "(sa:serv1 sa:hasObservedState *)" and "(sa:serv1 sa:hasDesiredState *)" in the knowledge base. When for each of the statement patterns a respective statement has been found in the knowledge base, and the values "?y" and ?z" fulfill the "Equals(?y, ?z)" condition, the rule head returns the logical expression "true", otherwise "false".

For both the exists quantor and the all quantor, the reasoner searches in the knowledge base for all combinations of statements, where the statements match corresponding parts of the rule head with pre-bound variables. When properties of the rule head have a cardinality "N" or the subjects of statement patterns in the rule head are not pre-bound to specific resources, the knowledge base can return more than one hit for a statement pattern.

In the case of the exists quantor, for example, "exists(?x, ?y, ?z)", the rule head is separately tested for each retrieved combination of statements, where parts of the retrieved statements matching the rule head replace the corresponding rule variables, "?x", "?y", and "?z", specified by the exists quantor. Consequently, the rule head is also separately executed for the result of each of the tests.

In the case of the all quantor, for example, "forAll(?y)", the reasoner tests the rule head once for a conjunction of all retrieved combinations of statements, where parts of the retrieved statements matching the rule head replace the variable "?y" specified by the "forAll(?y)" quantor. For example, when the rule "sa:mapGroupCompoundState" (486) has a pre-binding "?x=sa:servgrp", the reasoner uses the select pattern "(sa:servgrp sa:hasMember ?y) & (sa:servgrp sa:hasCompoundState ok) & (?y sa:hasCompoundState ok)" to retrieve all combinations of statements from the knowledge base. The retrieved statements provide bindings of the variable "?y" to the retrieved resources. The reasoner tests if the rule head condition can be fulfilled for each of the resources bound to the variables "?y", and not for only one resource matching "?y". If the test is successful for all the resources, the rule head returns the logical expression "true", otherwise "false".

The rule body has at least one of a positive command and a negative command. The rule (483) has, for example, the positive command "ADD (?x sa:hasCompoundState ok)" and the negative command "ADD (?x sa:hasCompoundState warning)" for adding respective statements to the knowledge base after binding the variable "?x". The positive command is determined when the evaluation of the logical expression returns "true" and the negative command is determined when the evaluation of the logical expression returns "false". The rules (483, 486) have both positive and negative commands. In the rules (489, 492, 493, 496), only the positive commands are defined. When the negative command is missing in the rule body and the evaluation of the logical expression returns "false", the reasoner does not perform any actions. The rule body can also comprise remove commands, such as "REMOVE(?x sa:hasCompoundState ok)" to remove respective statements, for example, "(?x sa:hasCompoundState ok)", from the knowledge base after binding the variable "?x". When the rule body comprises action requests, they are sent to the automation adapter. Examples are shown in rules (492, 493), where the automation engine submits an action request "REQUEST(sa:db, online)" to change the "observed" state of the target resource "sa:db" to "online."

The quantors, the rule head, and the positive and negative commands of the rule body are typically separated by pre-defined separator characters. In some example embodiments, the respective separators ":", "→", ",", and "|" are used.

FIGS. 5a-d illustrate sample contents of data structures of the automation engine for the server automation system, according to some example embodiments. FIG. 5a illustrates rule entries in the evaluation strategy table for statement patterns specifying a changed resource and a changed property. Each of the rules can be associated with one or more pre-bindings.

The individual rule "sa:mapCompoundState" (483) determines a compound state of a resource. When the "observed" and "desired" states of a specific resource are "equal", the rule evaluation returns "true", and the first add command of the rule body is generated, which sets the value "ok" for the property "sa:hasCompoundState". When the evaluation returns "false", the second add command is created and the property "sa:hasCompoundState" gets the value "warning" in the knowledge base. The evaluation strategy updater determines two statement patterns (501, 505) for the rule "sa:mapCompoundState" and the resource "sa:serv1" that is pre-bound to the variable "?x". The respective entries (501, 505) are stored in the evaluation strategy table. The rule has an "exists (?x, ?y, ?z)" quantor for all three variables. The variable "?x" is already pre-bound. When the rule "sa:mapCompoundState" is evaluated, the reasoner finds at least one combination of the unbound variables "?y" and "?z" and at least one corresponding combination of statements in the knowledge base to match the rule head.

The individual rule "sa:mapGroupCompoundState" (486) determines the "compound" state of a group. Only when all the "compound" states of all group members are "ok", the "compound" state of the group is also "ok". The evaluation strategy updater inserts one rule (512) into the evaluation strategy table for a specific group "sa:servgrp". The rule has an "forAll(?y)" quantor. When the rule is evaluated, the reasoner searches for all occurrences of statements in the knowledge base that match the statement pattern "(sa:servgrp rdf:hasMember ?y)", and thus determines all members of the group.

The individual rule "sa:startDependingResource" (492) sends an action request to the automation adapter to change the "observed" state of a resource "?y" to "online" when the "observed" state of this resource "?y" is "offline" and a further resource "?x" that depends on the resource "?y" has the "desired" state "online". The rule "sa:startDirectResource" (493) sends the action request to the resource "?x" that depends on the resource "?y" when the resource "?x" has a desired state "online" and an observed state "offline", and the resource "?y" further has an observed state "online". In both rules (492, 493), the dependency is a "sa:startAfter" relationship. The evaluation strategy updater pre-binds the variable "?x" to both rules (492, 493) and determines for the individual rule "sa:startDependingResource" (492) two statement patterns (502, 508) and for the individual rule "sa:startDirectResource" (493) three statement patterns (503, 506, 509). The pre-binding for both rules reads "?x=sa:serv1". Information about the associations between statement patterns and rules is stored in the respective entries (502, 503, 506, 508, 509) of the evaluation strategy table. The pre-binding "?x=sa:serv1" pre-determines the argument "?x" of the "exists(?x)" quantor. The evaluation strategy updater cannot pre-bind, however, the arguments of the "forAll(?y)" quantor. The reasoner searches for all combinations of statements from the knowledge base that match the rule head and replace the variable "?y".

From the individual rule "sa:forcedDownByResource" (496), the rule for setting the "sa:forcedDownBy" property of the resource "?x" is derived. The value "?y" of the property "sa:forcedDownBy" is the resource that is forcing down the resource "?x". The following condition has to be satisfied: the forced-down resource "?x" depends on the down-forcing resource "?y", the down-forcing resource "?y" has an "observed" state "offline" and the forced-down resource "?x" has a "desired" state "online". In this rule, the dependency between the forced-down resource and the down-forcing resource is a "sa:startAfter" relationship. The evaluation strategy updater inserts the corresponding rules (504, 507, 510, 511) into the evaluation strategy table and associates the rules "sa:forcedDownByResource" with pre-bindings. To increase the efficiency of testing rules, all the unbound variables, "?x" and "?y", are pre-bound with matching resources, that is, "?x=sa:serv1" and "?y=sa:db". The resources "sa:serv1" and "sa:db" have been pre-determined by the evaluation strategy updater. The knowledge base could usually have more "sa:startAfter" relationships between respective resources, which would cause even more entries in the evaluation strategy table. This is possible because the variables "?x" and "?y" are arguments of the "exists(?x, ?y)" quantor, which requires just one combination of statements to satisfy the rule head.

In the evaluation strategy table, one statement pattern can be associated with multiple rules. In this case, the corresponding subset of rules is aggregated into a list. For example, the statement pattern "(sa:serv1 sa:hasDesiredState)" has the respective rules (501, 502, 503, 504), which are grouped into one entry in the evaluation strategy table. Each of the rules is associated with one or more respective pre-bindings, for example, "?x=sa:serv1" and "?y=sa:db".

The system operating component typically defines an automation policy by sets of rules that are associated with respective classes and a list of commands that are describing class-memberships and properties of resources. An automation policy is commonly a major change of the behavior and setup of the automation system. The loading of rules into the knowledge base could be directly performed without using the command queue. The commands describing the resources, however, can be put into the command queue.

FIG. 5b shows an example of commands (521, . . . , 529) that describe the sample resources of the "server automation" problem. These commands comprise, for example, class-memberships (521, . . . , 524) of resources, relationships (527, . . . , 529) between the resources, and "desired states" (525, 526) of the resources. The relationships between the resources can be, for example, a "sa:startAfter" relationship (529) and a "sa:hasMember" relationship (527, 528). The resources can be individual resources, for example, "sa:serv1", "sa:serv2", and "sa:db", or also groups of resources "sa:servgrp". After loading new rules into the knowledge base, the automation engine typically resets the evaluation strategy information and creates new entries in the evaluation strategy table from scratch.

An automation goal typically contains a minor change, for example, a change of a "desired" state of a resource of the automation domain. The system operating component creates usually only a few commands (541) as shown in FIG. 5c and puts these commands in the command queue of the automation engine.

FIG. 5d illustrates a sample action request (551), which is put into the request queue and sent to the automation adapter. The request comprises, for example, a target resource and a target resource state.

The process state representation, the ontology information, the evaluation strategy information and the conclusion graph information can be stored by persistent storage means, for example, a database system or a file system. In the file system, the information can be represented by XML files. Alternatively, the files can have other formats, for example, plain text. In the XML files, parts of the information, for example, the parts of the RDF statements, can be represented as URIs.

Alternatively, this information can be stored by transient storage means, for example, memory means. The commands and selected rules can be stored by transient storage means, but can also be stored persistently.

The description of the example embodiments does not limit the data structures in which this information is represented in storage and by program code. For an implementation, alternative data structures can be selected. For example, the information of the knowledge base table, the evaluation strategy table, and the conclusion table can be separated into respective sets of tables of the database system. Thereby, the tables and corresponding indices can provide optimized data distribution and data access.

Alternatively, the inference relationships can be stored in a tree-like data structure. The command queue can also be implemented as a list data structure, which preserves the order in which the commands are received from the automation engine or generated by the reasoner or the consistency checker. All the information can be represented by data objects, which have an appropriate internal data structure and references to one another, and which can be stored by memory means.

In some example embodiments, the statements can have, for example, a four-part form with a subject, a predicate, and two objects, where the two objects represent further IT resources or data values. This four-part form allows even more complex properties of the IT resources. The command operations are not restricted to "add" and "remove". A "modify" command can replace a sequence of a remove command and an add command. A "log" command can write statement information to an event log or to an operations console.

As will be appreciated by one skilled in the art, aspects of the embodiments may be embodied as a system, method or computer program product. Accordingly, aspects of some example embodiments can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the embodiments can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device. Program code embodied on a computer readable medium can be transmitted using any appropriate medium, including but not limited to wireless, wireline, optical fiber cable, RF, etc., or any suitable combination of the foregoing.

Computer program code for carrying out operations for some example embodiments can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection may be made to an external computer (for example, through the Internet using an Internet Service Provider).

Some example embodiments are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to some example embodiments. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer program product for managing a plurality of information technology resources, the computer program product comprising:

a computer readable storage medium having computer readable program code embodied therewith, the computer readable program code configured to, maintain descriptions of the plurality of information technology resources in a computer-readable storage medium, wherein the descriptions indicate a set of one or more properties and settings of the set of one or more properties for the plurality of information technology resources, wherein at least a first of the set of one or more properties for each of the plurality of information technology resources is set to indicate at least one resource class that is associated with a plurality of rules and defines resource behavior;

maintain a plurality of evaluation strategies, wherein the evaluation strategies include associations of command patterns, that are determined to match respective sets of commands to be processed, with the plurality of rules with forms of changes to the plurality of information technology resources, wherein each of the plurality of rules comprises Boolean statement and an operation to perform based on outcome of the Boolean statement; and responsive to detection of a received command to change a first property of the set of properties of a first information technology resource of the plurality of information technology resources, select a subset of rules based on an evaluation strategy in accordance with one or more of the command patterns that match the received command, wherein each rule of the subset of rules comprises a determined priority and bindings to variables associated with the command patterns, rank each rule in the subset of rules to determine an order of execution based upon each rules determined priority and the variables associated with the command patterns, evaluate a rule of the subset of rules, based on the ranked order of execution, update evaluation strategy information associated with the evaluation strategy, wherein the rule evaluated may create a generated command to make another change to the first information technology resource; and perform the operation of the rule.

2. The computer program product of claim 1, further comprising:
determining that a second command to make a second change to the first information technology resource is inferentially associated to the command as indicated by inferential relationship data;
wherein said performing the operation of the at least one rule comprises submitting the second command to make the second change to the first information technology resource.

3. The computer program product of claim 1, wherein the command to change is an add command to set the first property of the first information technology resource to a value.

4. The computer program product of claim 1, wherein the command to change is a remove command to either remove the first property of the first information technology resource from the computer readable storage medium or to reset the first property of the first information technology resource to a default value.

5. The computer program product of claim 1, wherein the plurality of rules have a rank that defines an order of evaluation.

6. The computer program product of claim 1, wherein performance of the operation causes a change of a state of the first information technology resource from offline to online.

7. An apparatus comprising:
a processor;
a computer-readable storage medium;
an automation adapter executable on the processor; and
an automation engine executable on the processor and operable to maintain descriptions of a plurality of information technology resources in the computer-readable storage medium, wherein the descriptions indicate a set of one or more properties and settings of the set of one or more properties for the plurality of information technology resources, wherein at least a first of the set of one or more properties for each of the plurality of information technology resources is set to indicate at least one resource class that is associated with a plurality of rules and defines resource behavior;
wherein the automation engine is operable to maintain a plurality of evaluation strategies, wherein the evaluation strategies include associations of command patterns, that are determined to match respective sets of commands to be processed, with the plurality of rules with forms of changes to the plurality of information technology resources, wherein each of the plurality of rules comprises Boolean statement and an operation to perform based on outcome of the Boolean statement; and
wherein responsive to detection of a received command to change a first property of the set of properties of a first information technology resource of the plurality of information technology resources, the automation engine operable to select subset of rules based on an evaluation strategy in accordance with one or more of the command patterns that match the received command, wherein each rule of the subset of rules comprises a determined priority and bindings to variables associated with the command patterns;
the automation engine operable to rank each rule in the subset of rules to determine an order of execution based upon each rules determined priority and the variables associated with the command patterns;
the automation engine operable to evaluate a rule of the subset of rules, based on the ranked order of execution, update evaluation strategy information associated with the evaluation strategy, wherein the rule evaluated may create a generated command to make another change to the first information technology resource; and
the automation adapter operable to perform the operation of the rule.

8. The apparatus of claim 7, wherein the automation engine is operable to determine that a second command to make a second change to the first information technology resource is inferentially associated to the command as indicated by inferential relationship data,
wherein the automation engine is operable to submit the second command to make the second change to the first information technology resource, as part of performance of the operation of the at least one rule.

9. The apparatus of claim 7, wherein the command to change is an add command to set the first property of the first information technology resource to a value.

10. The apparatus of claim 7, wherein the command to change is a remove command to either remove the first property of the first information technology resource from the computer-readable storage medium or to reset the first property of the first information technology resource to a default value.

11. The apparatus of claim 7, wherein the plurality of rules have a rank that defines an order of evaluation.

12. The apparatus of claim 7, wherein performance of the operation by the automation adapter causes a change of a state of the first information technology resource from offline to online.

* * * * *